US009792633B2

(12) United States Patent
Bookstaff

(10) Patent No.: US 9,792,633 B2
(45) Date of Patent: *Oct. 17, 2017

(54) METHOD AND SYSTEM FOR INTELLIGENT PROCESSING OF ELECTRONIC INFORMATION WITH CLOUD COMPUTING

(75) Inventor: Blake Bookstaff, Knoxville, TN (US)

(73) Assignee: Blake Bookstaff, Knoxville, TN (US)

( * ) Notice: Subject to any disclaimer, the term of this patent is extended or adjusted under 35 U.S.C. 154(b) by 1460 days.

This patent is subject to a terminal disclaimer.

(21) Appl. No.: 13/323,264

(22) Filed: Dec. 12, 2011

(65) Prior Publication Data

US 2012/0084665 A1 Apr. 5, 2012

Related U.S. Application Data

(63) Continuation-in-part of application No. 11/636,226, filed on Dec. 8, 2006, now Pat. No. 8,078,977, which
(Continued)

(51) Int. Cl.
*G06Q 30/06* (2012.01)
*G06F 17/30* (2006.01)
(Continued)

(52) U.S. Cl.
CPC ... *G06Q 30/0603* (2013.01); *G06F 17/30867* (2013.01); *G06Q 10/02* (2013.01);
(Continued)

(58) Field of Classification Search
CPC .................................................. G06C 30/0603
See application file for complete search history.

(56) References Cited

U.S. PATENT DOCUMENTS

| 3,928,724 A | 12/1975 | Byram et al. |
| 4,053,949 A | 10/1977 | Recca et al. |

(Continued)

FOREIGN PATENT DOCUMENTS

| CA | 2394207 A1 * | 7/2001 | ............ H04N 7/163 |
| EP | 1 662 366 A1 | 5/2006 | |

(Continued)

OTHER PUBLICATIONS

Partial European Search Report EP 08 01 8481 dated Nov. 28, 2008.
(Continued)

*Primary Examiner* — Jeffrey A Gaffin
*Assistant Examiner* — John M Heffington
(74) *Attorney, Agent, or Firm* — Lesavich High-Tech Law Group, S.C.; Stephen Lesavich

(57) ABSTRACT

A method and system for intelligent electronic information processing with cloud computing. The method and system include selecting one or more portions of a set of electronic information including any unwanted portions that have been reviewed and are to be eliminated from display. The selected portions are recorded on a cloud computing network in a cloud computing object thereby eliminating any unwanted previously reviewed portions of the set of electronic information from display with display of any additional sets of electronic information. The previously reviewed portions without the reviewed and unwanted portions are available to and across plural network devices and across plural login accounts anywhere on the cloud computing network.

20 Claims, 12 Drawing Sheets

Related U.S. Application Data is a continuation-in-part of application No. 11/170,263, filed on Jun. 29, 2005, now Pat. No. 7,720,828.

(60) Provisional application No. 60/583,960, filed on Jun. 29, 2004.

(51) Int. Cl.
- G06Q 10/02 (2012.01)
- G06Q 30/08 (2012.01)
- H04L 29/08 (2006.01)

(52) U.S. Cl.
CPC ......... G06Q 30/08 (2013.01); H04L 67/1097 (2013.01); H04L 67/26 (2013.01)

(56) References Cited

U.S. PATENT DOCUMENTS

| | | |
|---|---|---|
| 4,071,698 A | 1/1978 | Barger, Jr. et al. |
| 4,232,199 A | 11/1980 | Boatwright et al. |
| 4,446,337 A | 5/1984 | Cofer |
| 4,451,704 A | 5/1984 | Winkelman |
| 4,608,460 A | 8/1986 | Carter et al. |
| 4,654,482 A | 3/1987 | DeAngelis |
| 4,791,666 A | 12/1988 | Cobb et al. |
| 4,850,007 A | 7/1989 | Marino et al. |
| 4,897,866 A | 1/1990 | Majmudar et al. |
| 4,918,719 A | 4/1990 | Daudelin |
| 4,943,995 A | 7/1990 | Daudelin et al. |
| 4,959,855 A | 9/1990 | Daudelin |
| 4,975,941 A | 12/1990 | Morganstein et al. |
| 4,979,206 A | 12/1990 | Padden et al. |
| 5,131,024 A | 7/1992 | Pugh et al. |
| 5,377,354 A | 12/1994 | Scannell |
| 5,425,097 A | 6/1995 | Pula |
| 5,448,625 A | 9/1995 | Lederman |
| 5,473,671 A | 12/1995 | Partridge, III |
| 5,475,746 A | 12/1995 | Miller et al. |
| 5,485,511 A | 1/1996 | Iglehart et al. |
| 5,515,098 A | 5/1996 | Carles |
| 5,544,236 A | 8/1996 | Andruska et al. |
| 5,619,562 A | 4/1997 | Maurer et al. |
| 5,642,407 A | 6/1997 | He |
| 5,652,784 A | 7/1997 | Blen et al. |
| 5,661,788 A | 8/1997 | Chin |
| 5,701,419 A | 12/1997 | McConnell |
| 5,734,710 A | 3/1998 | Hirth et al. |
| 5,751,802 A | 5/1998 | Carr et al. |
| 5,757,899 A | 5/1998 | Boulware et al. |
| 5,802,149 A | 9/1998 | Hanson |
| 5,825,862 A | 10/1998 | Voit et al. |
| 5,835,570 A | 11/1998 | Wattenbarger |
| 5,852,775 A | 12/1998 | Hidary |
| 5,873,032 A | 2/1999 | Cox et al. |
| 5,875,231 A | 2/1999 | Farfan et al. |
| 5,878,219 A * | 3/1999 | Vance, Jr. ......... G06F 17/30887 707/E17.115 |
| 5,878,338 A | 3/1999 | Alperovich et al. |
| 5,880,770 A | 3/1999 | Ilcisin et al. |
| 5,892,820 A | 4/1999 | Armstrong |
| 5,895,465 A * | 4/1999 | Guha ............... G06F 17/30392 707/714 |
| 5,943,410 A | 8/1999 | Shaffer et al. |
| 5,966,437 A | 10/1999 | Cox et al. |
| 5,977,964 A * | 11/1999 | Williams ............. G11B 27/105 348/E17.005 |
| 5,983,544 A | 11/1999 | Fagan |
| 5,987,611 A * | 11/1999 | Freund ................. G06F 21/552 726/4 |
| 6,026,429 A * | 2/2000 | Jones ................ G06F 17/30864 705/27.1 |
| 6,031,904 A | 2/2000 | An et al. |
| 6,035,190 A | 3/2000 | Cox et al. |
| 6,038,307 A | 3/2000 | Fahrer et al. |
| 6,061,439 A | 5/2000 | Bleile et al. |
| 6,084,628 A | 7/2000 | Sawyer |
| 6,104,786 A | 8/2000 | Gibilisco et al. |
| 6,118,860 A | 9/2000 | Hillson et al. |
| 6,178,446 B1 | 1/2001 | Gerszberg et al. |
| 6,188,751 B1 | 2/2001 | Scherer |
| 6,198,812 B1 | 3/2001 | Weber |
| 6,205,215 B1 | 3/2001 | Dombakly |
| 6,256,515 B1 | 7/2001 | Cox et al. |
| 6,301,338 B1 | 10/2001 | Makela |
| 6,301,342 B1 | 10/2001 | Ander et al. |
| 6,310,948 B1 | 10/2001 | Nemeth |
| 6,324,273 B1 | 11/2001 | Alcott |
| 6,327,343 B1 | 12/2001 | Epstein et al. |
| 6,327,344 B1 | 12/2001 | Paxson |
| 6,347,225 B1 | 2/2002 | Nishiyama |
| 6,353,852 B1 | 3/2002 | Nestoriak, III et al. |
| 6,356,899 B1 * | 3/2002 | Chakrabarti ...... G06F 17/30873 707/737 |
| 6,381,320 B1 | 4/2002 | Creamer et al. |
| 6,400,804 B1 | 6/2002 | Bilder |
| 6,456,709 B1 | 9/2002 | Cox et al. |
| 6,473,612 B1 | 10/2002 | Cox et al. |
| 6,504,912 B1 | 1/2003 | Glossbrenner |
| 6,516,311 B1 | 2/2003 | Yacoby |
| 6,587,138 B1 | 7/2003 | Vogt et al. |
| 6,587,549 B1 | 7/2003 | Weik |
| 6,590,970 B1 | 7/2003 | Cai et al. |
| 6,594,654 B1 * | 7/2003 | Salam ............... G06F 17/30861 |
| 6,597,769 B2 | 7/2003 | Snow |
| 6,614,896 B1 | 9/2003 | Rao |
| 6,615,248 B1 * | 9/2003 | Smith ............... G06F 17/30017 707/E17.009 |
| 6,618,474 B1 | 9/2003 | Reese |
| 6,633,850 B1 | 10/2003 | Gabbard |
| 6,668,281 B1 | 12/2003 | Ayyadurai |
| 6,718,551 B1 | 4/2004 | Swix et al. |
| 6,769,009 B1 * | 7/2004 | Reisman .................. G06F 8/65 705/27.1 |
| 6,856,673 B1 | 2/2005 | Banks et al. |
| 6,922,843 B1 * | 7/2005 | Herrington ............ H04N 7/163 348/E7.061 |
| 6,965,919 B1 | 11/2005 | Woods et al. |
| 6,977,997 B2 | 12/2005 | Shioda et al. |
| 7,013,323 B1 | 3/2006 | Thomas |
| 7,100,199 B2 | 8/2006 | Ginter |
| 7,187,761 B2 | 3/2007 | Bookstaff |
| 7,227,936 B2 | 6/2007 | Bookstaff |
| 7,573,993 B2 | 8/2009 | Bookstaff |
| 7,640,336 B1 * | 12/2009 | Lu .......................... G06Q 10/10 709/206 |
| 7,647,240 B2 * | 1/2010 | Freedman ............ G06F 19/328 705/2 |
| 7,720,828 B2 | 5/2010 | Bookstaff |
| 8,078,977 B2 | 12/2011 | Bookstaff |
| 8,130,928 B2 | 3/2012 | Bookstaff |
| 8,254,547 B2 | 8/2012 | Bookstaff et al. |
| 8,254,548 B2 | 8/2012 | Bookstaff et al. |
| 8,254,549 B2 | 8/2012 | Bookstaff et al. |
| 8,363,806 B2 | 1/2013 | Bookstaff |
| 8,463,765 B2 | 6/2013 | Lesavich |
| 8,472,607 B2 | 6/2013 | Bookstaff et al. |
| 8,472,608 B2 | 6/2013 | Bookstaff et al. |
| 8,495,047 B2 | 7/2013 | Bookstaff |
| 8,542,809 B2 | 9/2013 | Bookstaff |
| 8,611,517 B2 | 12/2013 | Bookstaff |
| 8,693,664 B2 | 4/2014 | Bookstaff et al. |
| 8,913,728 B2 | 12/2014 | Bookstaff |
| 8,913,732 B2 | 12/2014 | Bookstaff |
| 9,037,564 B2 | 5/2015 | Lesavich et al. |
| 9,137,250 B2 | 9/2015 | Lesavich et al. |
| 9,361,479 B2 | 6/2016 | Lesavich et al. |
| 2001/0012344 A1 | 8/2001 | Kwon |
| 2002/0044639 A1 | 4/2002 | Shioda et al. |
| 2002/0049968 A1 | 4/2002 | Wilson et al. |
| 2002/0051521 A1 | 5/2002 | Patrick |
| 2002/0091566 A1 | 7/2002 | Siegel |
| 2002/0107730 A1 | 8/2002 | Bernstein |

(56) References Cited

U.S. PATENT DOCUMENTS

| | | | |
|---|---|---|---|
| 2002/0184496 A1* | 12/2002 | Mitchell | G06Q 20/3821 |
| | | | 713/168 |
| 2002/0193095 A1 | 12/2002 | Hutcheson et al. | |
| 2002/0194061 A1 | 12/2002 | Himmel et al. | |
| 2003/0007620 A1 | 1/2003 | Elsey et al. | |
| 2003/0033198 A1 | 2/2003 | Flannery et al. | |
| 2003/0041126 A1 | 2/2003 | Buford | |
| 2003/0050837 A1 | 3/2003 | Kim | |
| 2003/0061111 A1* | 3/2003 | Dutta | G06Q 30/02 |
| | | | 705/26.1 |
| 2003/0063721 A1 | 4/2003 | Hirose | |
| 2003/0161464 A1 | 8/2003 | Rodriguez et al. | |
| 2003/0177063 A1 | 9/2003 | Currans et al. | |
| 2003/0212710 A1 | 11/2003 | Guy | |
| 2003/0223563 A1 | 12/2003 | Wolmuth | |
| 2003/0231754 A1 | 12/2003 | Stein et al. | |
| 2004/0003071 A1* | 1/2004 | Mathew | G06F 17/30867 |
| | | | 709/223 |
| 2004/0023644 A1 | 2/2004 | Montemer | |
| 2004/0039786 A1 | 2/2004 | Horvitz et al. | |
| 2004/0107125 A1 | 6/2004 | Guheen et al. | |
| 2004/0154022 A1* | 8/2004 | Boss | G06Q 10/107 |
| | | | 719/310 |
| 2005/0050222 A1* | 3/2005 | Packer | G06F 17/30867 |
| | | | 709/238 |
| 2005/0055545 A1* | 3/2005 | Guo | G06F 9/445 |
| | | | 713/1 |
| 2005/0102407 A1* | 5/2005 | Clapper | G06F 17/30887 |
| | | | 709/228 |
| 2005/0108362 A1* | 5/2005 | Weinert | H04L 67/10 |
| | | | 709/217 |
| 2005/0120369 A1* | 6/2005 | Matz | H04N 7/163 |
| | | | 725/40 |
| 2005/0144297 A1* | 6/2005 | Dahlstrom | H04L 63/101 |
| | | | 709/229 |
| 2005/0182673 A1 | 8/2005 | Marzian et al. | |
| 2005/0216457 A1 | 9/2005 | Walther | |
| 2005/0235261 A1* | 10/2005 | Krebs | G06F 8/38 |
| | | | 717/118 |
| 2005/0289113 A1 | 12/2005 | Bookstaff | |
| 2006/0161524 A1 | 7/2006 | Roy | |
| 2007/0106654 A1 | 5/2007 | Bookstaff | |
| 2007/0130030 A1 | 6/2007 | Bookstaff | |
| 2007/0253544 A1 | 11/2007 | Bookstaff | |
| 2009/0168987 A1 | 7/2009 | Bookstaff | |
| 2009/0175431 A1 | 7/2009 | Bookstaff | |
| 2009/0175433 A1 | 7/2009 | Bookstaff | |
| 2010/0268597 A1 | 10/2010 | Bookstaff | |
| 2011/0137947 A1* | 6/2011 | Dawson | G06F 21/604 |
| | | | 707/785 |
| 2011/0208710 A1 | 8/2011 | Lesavich | |
| 2012/0084665 A1 | 4/2012 | Bookstaff | |
| 2012/0185307 A1 | 7/2012 | Bookstaff | |
| 2012/0278622 A1 | 11/2012 | Lesavich et al. | |
| 2013/0034217 A1 | 2/2013 | Bookstaff et al. | |
| 2013/0034224 A1 | 2/2013 | Bookstaff et al. | |
| 2013/0034225 A1 | 2/2013 | Bookstaff et al. | |
| 2013/0138504 A1 | 5/2013 | Bookstaff | |
| 2013/0204717 A1 | 8/2013 | Bookstaff | |
| 2014/0108151 A1 | 4/2014 | Bookstaff | |
| 2014/0189792 A1 | 7/2014 | Lesavich et al. | |
| 2014/0220945 A1 | 8/2014 | Bookstaff | |
| 2015/0379301 A1 | 12/2015 | Lesavich et al. | |

FOREIGN PATENT DOCUMENTS

| | | |
|---|---|---|
| WO | WO 00/38399 A | 6/2000 |
| WO | WO 01/47264 A | 6/2001 |
| WO | WO 2004/029759 | 4/2004 |
| WO | WO 2004/042525 | 5/2004 |
| WO | WO 2007/024868 A2 | 3/2007 |

OTHER PUBLICATIONS

Partial PCT Search Report PCT/US2007/024,995.
Partial Canadian Patent Office Search Report 2,569,529.
"Yahoo Block" Internet Citation, [Online] (Jun. 18, 2005), XP-002413362 Retrieved By EPO Mar. 1, 2007.
Partial PCT Search Report PCT/US2005/023,495.
http://gmail.google.com, Jun. 16, 2004, retrieved on Feb. 14, 2007 at http://archive.org/web/web.php by Canadian Patent Office.
Partial PCT Search Report PCT/US2003/035,617.
Webwasher Com AG (Mar. 28, 2000), XP-002156461: Siemens-Backed WebWasher Empowers Companies to Remove Unwanted Web Content and Ensure Privacy Protection, Internet Citation, URL:http//www.seomoz.org/blogdetail.php?l,2pages.
internet:URL:http://www.seomoz.ort/blogdetail.php?ID=206> [retrieved on Jan. 3, 2007] the whole document.

\* cited by examiner

FIG. 4

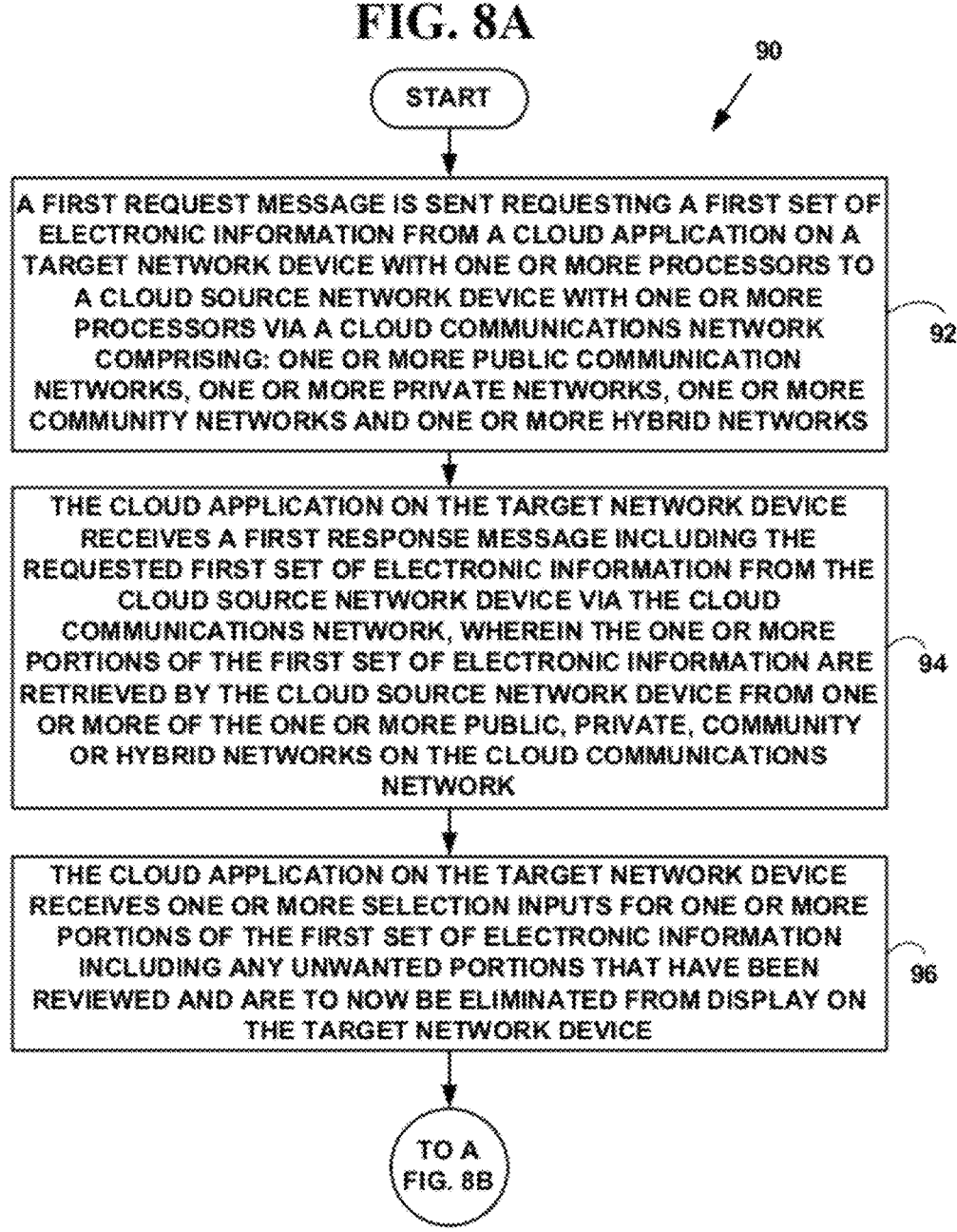

FIG. 8B

98 — A SECOND REQUEST MESSAGE IS SENT FROM THE CLOUD APPLICATION ON THE TARGET NETWORK DEVICE TO THE CLOUD SOURCE NETWORK DEVICE VIA THE CLOUD COMMUNICATIONS NETWORK INCLUDING AN INDICATION TO RECORD THE SELECTED ONE OR MORE UNWANTED PORTIONS OF THE FIRST SET ELECTRONIC INFORMATION ON THE CLOUD COMMUNICATIONS NETWORK THEREBY ELIMINATING ANY UNWANTED PREVIOUSLY REVIEWED PORTIONS OF THE FIRST SET OF ELECTRONIC INFORMATION FROM FURTHER DISPLAY WITH ANY ADDITIONAL SETS OF ELECTRONIC INFORMATION RECEIVED ON THE CLOUD APPLICATION ON THE CLOUD APPLICATION ON THE TARGET NETWORK DEVICE, WHEREIN THE CLOUD SOURCE NETWORK DEVICE REQUESTS CONTENTS OF THE SECOND REQUEST MESSAGE BE RECORDED AS A CLOUD STORAGE OBJECT ON OTHER CLOUD SOURCE NETWORK DEVICES ON THE ONE OR MORE PUBLIC, PRIVATE, COMMUNITY OR HYBRID NETWORKS ON THE CLOUD COMMUNICATIONS NETWORK, WHEREIN THE CLOUD STORAGE OBJECT COMPRISES PLURAL STORAGE LOCATIONS DISTRIBUTED ACROSS THE CLOUD COMMUNICATIONS NETWORK BUT FUNCTIONS AS A SINGLE STORAGE OBJECT AND WHEREIN THE CLOUD APPLICATION ON THE TARGET NETWORK DEVICE CANNOT DETERMINE WHICH OTHER CLOUD SOURCE NETWORK DEVICES ON THE ONE OR MORE PUBLIC, PRIVATE, COMMUNITY OR HYBRID NETWORKS ON THE CLOUD COMMUNICATIONS NETWORK MAY HAVE RECORDED THE CONTENTS OF THE SECOND MESSAGE IN THE CLOUD STORAGE OBJECT, THEREBY PROVIDING SECURITY AND PRIVACY FOR RECORDING REQUESTS MADE BY THE CLOUD APPLICATION ON THE TARGET NETWORK DEVICE

100 — A THIRD REQUEST MESSAGE IS SENT REQUESTING A SECOND SET OF ELECTRONIC INFORMATION FROM THE CLOUD APPLICATION ON THE TARGET NETWORK DEVICE TO THE CLOUD SOURCE DEVICE VIA THE CLOUD COMMUNICATIONS NETWORK

FIG. 8C

THE CLOUD APPLICATION ON THE TARGET NETWORK DEVICE RECEIVES A SECOND RESPONSE MESSAGE INCLUDING THE REQUESTED SECOND SET OF ELECTRONIC INFORMATION FROM THE CLOUD SOURCE NETWORK DEVICE VIA THE CLOUD COMMUNICATIONS NETWORK. ONE OR MORE PORTIONS OF THE SECOND SET OF ELECTRONIC INFORMATION ARE RETRIEVED BY THE CLOUD SOURCE NETWORK DEVICE FROM ONE OR MORE OF THE ONE OR MORE PUBLIC, PRIVATE, COMMUNITY OR HYBRID NETWORKS ON THE CLOUD COMMUNICATIONS NETWORK ON WHICH THE ONE OR MORE PORTIONS ARE SEPARATELY STORED — 102

THE CLOUD APPLICATION ON THE TARGET NETWORK DEVICE DISPLAYS THE RECEIVED SECOND SET OF ELECTRONIC INFORMATION. THE RECEIVED SECOND SET OF ELECTRONIC INFORMATION DOES NOT INCLUDE ANY UNWANTED PREVIOUSLY REVIEWED PORTIONS SELECTED AND RECORDED FROM THE FIRST SET OF ELECTRONIC INFORMATION — 104

THE RECORDED SELECTED ONE OR MORE UNWANTED PORTIONS OF THE FIRST SET ELECTRONIC INFORMATION IN THE CLOUD STORAGE OBJECT ARE USED IN REAL-TIME FOR PLURAL OTHER TARGET NETWORK DEVICES FROM A SAME USER OF THE TARGET NETWORK DEVICE AND FROM PLURAL DIFFERENT LOGIN ACCOUNTS FROM THE SAME USER ON PLURAL SERVER NETWORK DEVICES ON ANY OF THE ONE OR MORE PUBLIC, PRIVATE, COMMUNITY OR HYBRID NETWORKS ON THE CLOUD COMMUNICATIONS NETWORK, THEREBY REMOVING ANY UNWANTED PREVIOUSLY REVIEWED PORTIONS OF THE FIRST SET OF ELECTRONIC INFORMATION FROM DISPLAY ACROSS THE PLURAL OTHER TARGET NETWORK DEVICES FROM THE SAME USER AND ACROSS THE PLURAL DIFFERENT LOGINS FROM THE SAME USER WHEN USED FROM ANYWHERE ON THE CLOUD COMMUNICATIONS NETWORK — 106

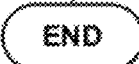

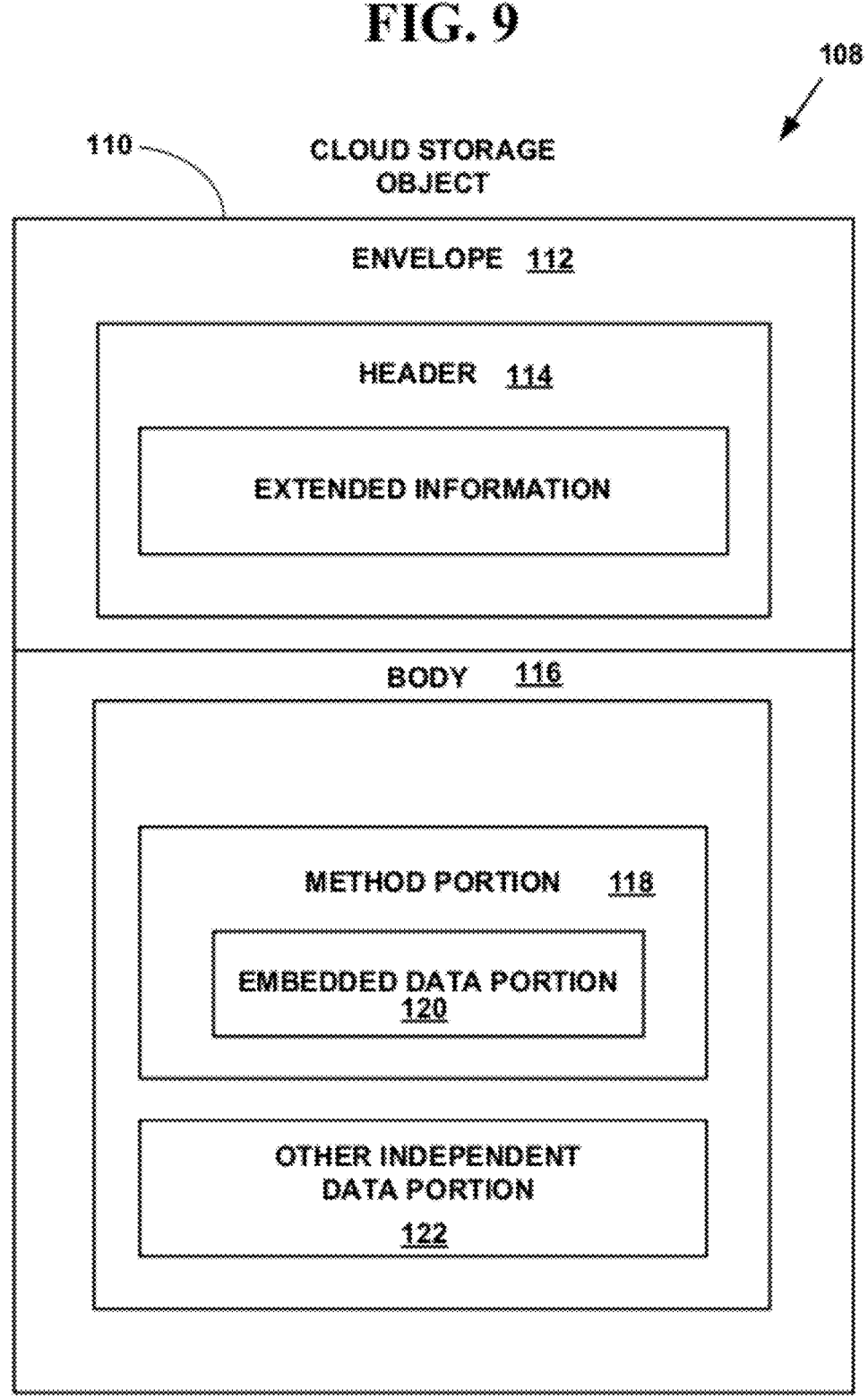

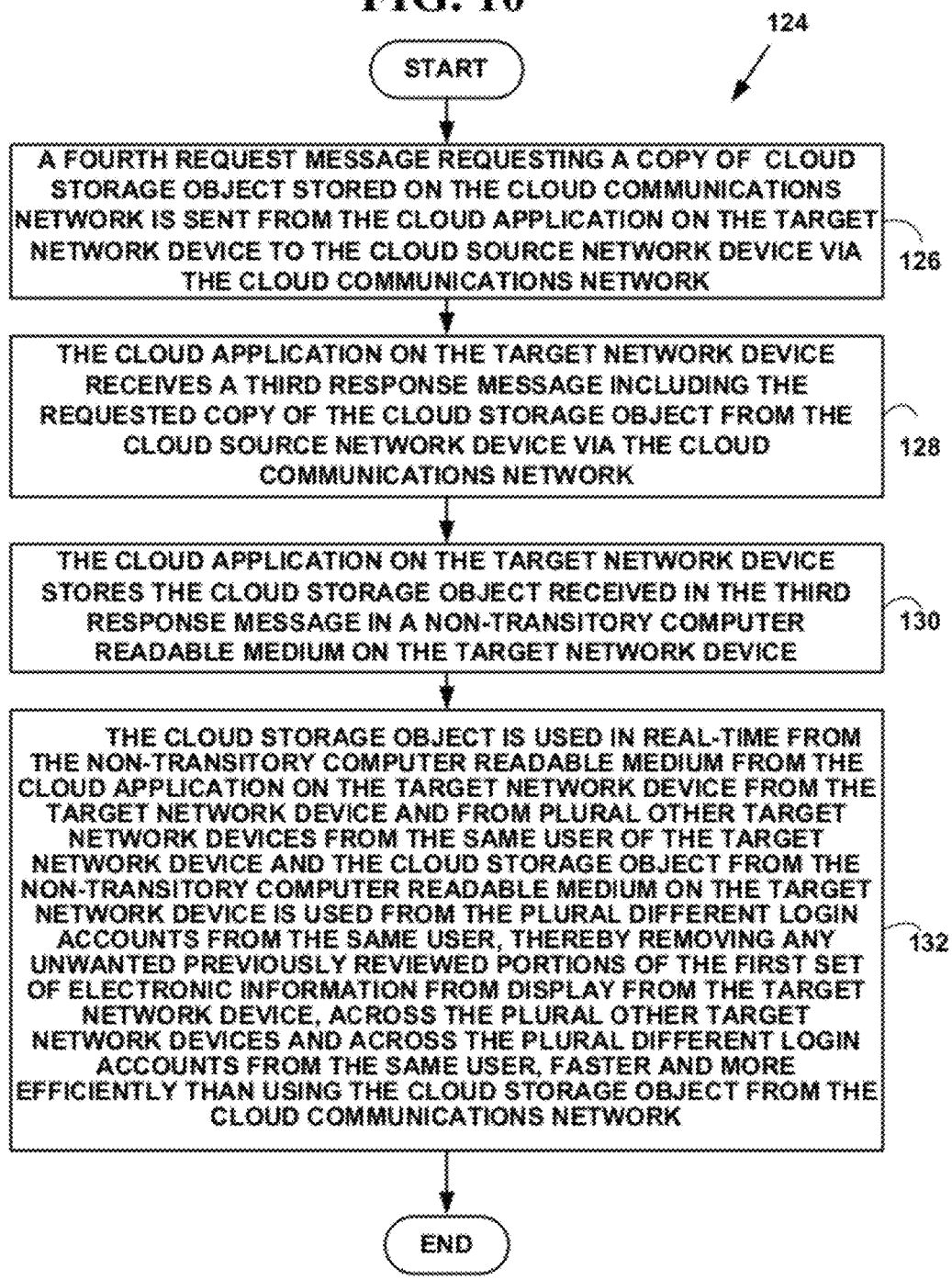

METHOD AND SYSTEM FOR INTELLIGENT PROCESSING OF ELECTRONIC INFORMATION WITH CLOUD COMPUTING

CROSS-REFERENCE TO RELATED APPLICATIONS

This application is a Continuation-In-Part (CIP) of U.S. patent application Ser. No. 11/636,226 filed Dec. 8, 2009, that issued as U.S. Pat. No. 8,078,977 on Dec. 13, 2011, that is a CIP of U.S. patent application Ser. No. 11/170,263, filed Jun. 29, 2005, that issued as U.S. Pat. No. 7,720,828, on May 18, 2010, that claims priority to U.S. Provisional Patent application 60/583,960, filed Jun. 29, 2004, the contents of all of which are incorporated by reference.

FIELD OF INVENTION

This application relates to automatic processing of electronic information. More specifically, it relates to a method and system for intelligent process of electronic information with cloud computing.

BACKGROUND OF THE INVENTION

The Internet and World-Wide-Web have changed the way organizations conduct business. Virtually every organization has a web-site that provides information about the organization and a description of the goods and/or services an organization may offer. As is known in the art, a "web-site" is group of related mark-up language documents and associated graphics and multi-media files, scripts, and databases, etc. that are served up by a server on the World-Wide-Web via the Internet. Business organizations also provide an electronic commerce (e-commerce) interface that allows users to purchase goods and/or services from such organizations.

There are many different type of web-sites on a spectrum ranging from very simple to very complex. Designing, implementing and deploying a web-site requires knowledge of markup languages such as Hyper Text Markup Language (HTML), eXtensible Markup Language (XML), programming languages such as JAVA, C++, C#, computer graphics functionality, multi-media functionality, etc. A knowledge of communications protocols such as Hyper Text Transfer Protocol (HTTP), Transmission Control Protocol (TCP), Internet Protocol (IP), e-mail protocols such as Simple Mail Transfer Protocol (SMTP), e-commerce protocols, encryption and other security protocols and many other types of protocols for various kinds of web functionalities.

Web-sites are searched for a wide variety of electronic information. Search engines such as Google, Lycos, Yahoo, etc. auction sites such as Ebay, news sites, and blog or other search sites or a browser, depending on settings, will highlight in a different color via a hyperlink search results that have been reviewed previously. However, such sites or browsers do not eliminate the results altogether from the results, causing a user to have to differentiate which highlighted items the user was interested in and which items the user was not interested in. Such search engines also do not transfer the highlighted results from computer to computer or user to user or login to login. They also do may not retain highlighted previously reviewed sites for any period of time.

There have been attempts to solve some of the problems associated with managing information items retrieved from search engines, electronic auctions and other sources. For example, U.S. Pat. No. 6,850,934, entitled "Adaptive search engine query," that issued to Bates, et al. teaches "embodiments provide a method, article of manufacture, and apparatus for searching for information on a network of computers using a modified search query. The search query is modified using translation data. The translation data is any information having a predefined association with the search query content. In one aspect, the translation data comprises a location value and a demographic profile value. The location value, demographic profile value, and search content may include any number and types of characters, keywords, symbols, numerals, etc. Upon receiving a search query, a translation program takes step to locate any keywords within the search content, wherein the keywords indicate that translation data is available for modifying the search query. If the search content contains keywords, then steps are taken to modify the query. The modified query may then be executed by a search tool. In some embodiments, the search tool and the translating program are integrated.

U.S. Pat. No. 6,658,432, entitled "Detecting duplicate and near duplicate files," that issued to Pugh et al., teaches "improved duplicate and near-duplicate detection techniques may assign a number of fingerprints to a given document by (i) extracting parts from the document, (ii) assigning the extracted parts to one or more of a predetermined number of lists, and (iii) generating a fingerprint from each of the populated lists. Two documents may be considered to be near-duplicates if any one of their fingerprints match."

U.S. Pat. No. 6,397,218, entitled "Network interactive search engine and method," that issued to Stern et al. teaches "in a search engine server, a method for searching for data in a data network comprising hyperlinked pages comprising the steps of (1) receiving an initial set of network addresses for pages in the data network; (2) receiving a non-negative integer, N, specifying a chain length; (3) receiving a set of at least one search argument comprising search criteria; and (4) performing a search wherein all pages linked to said initial set of addresses by a chain of distance less than or equal to N are examined for compliance with the search criteria, and all pages meeting such criteria are returned as successful objects of the search. According to optional embodiments, the foregoing method can be implemented as a computer readable medium with instructions for performing the above steps, as an application program, or a browser resident at an end user's computer system. It is also possible to implement as a special purpose information handling system."

U.S. Published Patent Application No. 20050010567, entitled "Method and apparatus for dynamic information connection search engine," that was published by Barth et al. teaches "a method and apparatus are provided for a dynamic information connection engine. User actions are detected on at least one client system. In response, a determination is made whether the user is searching for supported information. When the user is searching for supported information, information is extracted electronically from third party web sites, direct supplier connections, and intermediate databases. Potential information suppliers are automatically selected in response to the detected user search. Queries are formulated from the user search and transferred to each selected supplier over a network coupling. The queries include a request for information. Responses are received from the suppliers, and the responses are used to generate a result list for the user. The result list includes information and query status information. Further, an electronic link may be provided to a web site of each supplier from which the information was derived."

U.S. Published Patent Application No. 20020138479, entitled "Adaptive search engine query," that was published by Lee et al. teaches "embodiments provide a method, article of manufacture, and apparatus for searching for information on a network of computers using a modified search query. The search query is modified using translation data. The translation data is any information having a predefined association with the search query content. In one aspect, the translation data comprises a location value and a demographic profile value. The location value, demographic profile value, and search content may include any number and types of characters, keywords, symbols, numerals, etc. Upon receiving a search query, a translation program takes step to locate any keywords within the search content, wherein the keywords indicate that translation data is available for modifying the search query. If the search content contains keywords, then steps are taken to modify the query. The modified query may then be executed by a search tool. In some embodiments, the search tool and the translating program are integrated."

However, none of these solutions solve all of the problems associated with managing information items retrieved from search engines, electronic auctions and other sources. Thus, it is desirable to provide method and system for eliminating previously viewed electronic information from subsequent display with cloud computing. The eliminated electronic information should be eliminated across devices or logins.

SUMMARY OF THE INVENTION

In accordance with preferred embodiments of the invention, some of the problems associated with electronic advertising are overcome. A method and system for intelligent electronic information with cloud computing is presented.

The method and system include selecting one or more portions of a set of electronic information including any unwanted portions that have been reviewed and are to be eliminated from display. The selected portions are recorded on a cloud computing network in a cloud computing object thereby eliminating any unwanted previously reviewed portions of the set of electronic information from display with any additional sets of electronic information. The previously reviewed portions without the reviewed and unwanted portions are available to and across plural network devices and across plural login accounts anywhere on the cloud computing network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 4 is a block diagram illustrating the exemplary search engine results from FIG. 3 with exemplary radio buttons displayed for selecting portions;

FIGS. 8A, 8B and 8C are a flow diagram illustrating a method for intelligent electronic information processing with cloud computing;

FIG. 9 is a block diagram illustrating an exemplary cloud storage object; and FIG. 10 is a flow diagram illustrating a method for intelligent electronic information processing with cloud computing;

DETAILED DESCRIPTION OF THE INVENTION

Exemplary Electronic Information Message Processing System

Figure 1:
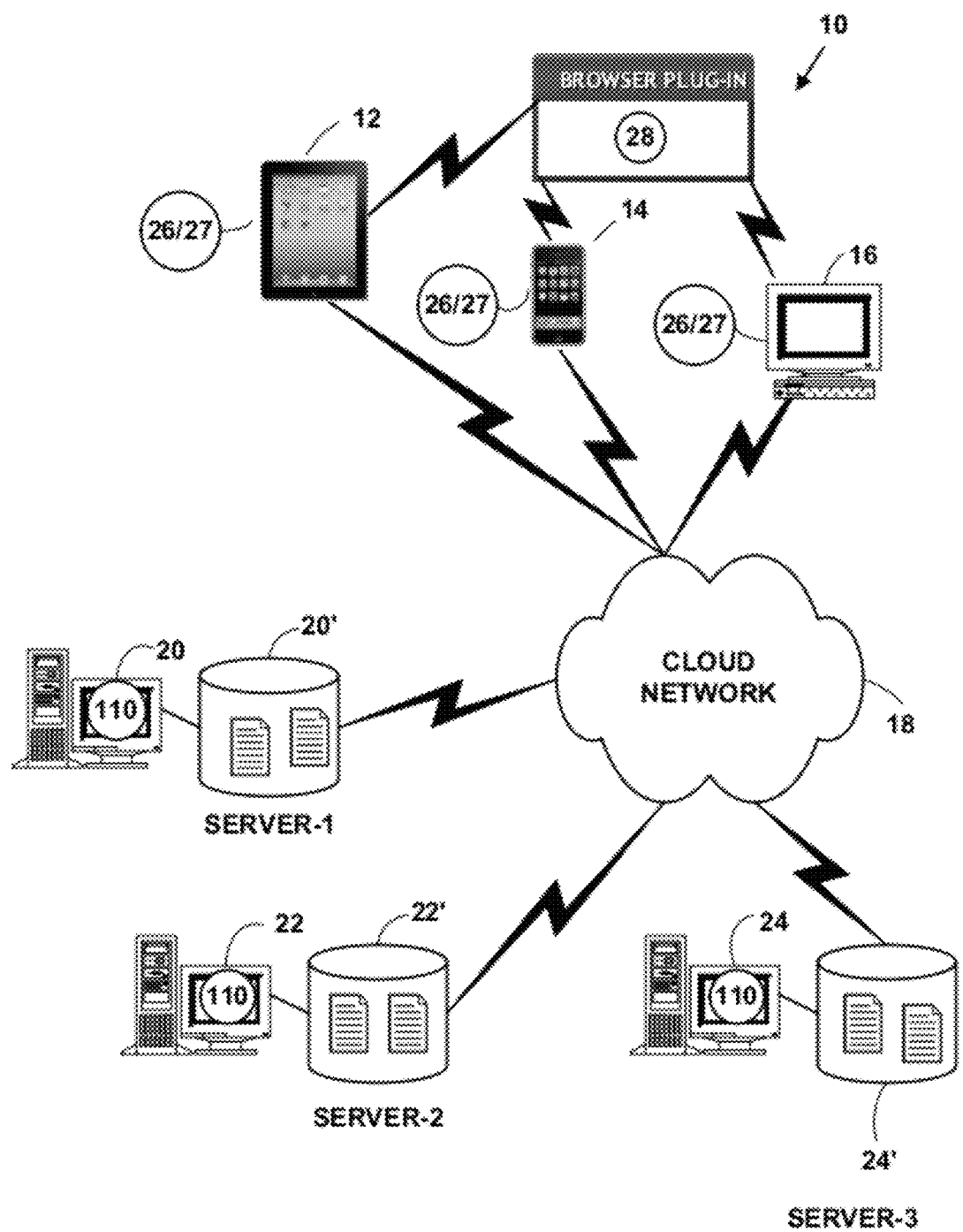
FIG. 1 is a block diagram illustrating an exemplary electronic information message processing system.

FIG. 1 is a block diagram illustrating an exemplary electronic information message processing system 10. The exemplary electronic information message processing system 10 includes, but is not limited to, one or more target network devices 12, 14, 16 (only three of which are illustrated) each with one or more processors.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV) set-top boxes, satellite television boxes, digital televisions including high definition television (HDTV), three-dimensional (3D) televisions and other types of network devices.

The one or more target network devices 12, 14, 16 also include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Andriod is an open source operating system platform backed by Google, along with major hardware and software developers (such as Intel, HTC, ARM, Motorola and Samsung, etc.), that form the Open Handset Alliance.

The one or more target network devices 12, 14, 16 also include tablet computers such as the iPad, by Apple, Inc., the HP Tablet, by Hewlett Packard, Inc., the Playbook, by RIM, Inc., the Tablet, by Sony, Inc.

The plural target network devices 12, 14, 16 and/or the source network devices 20, 22, 24 include an application 26 with plural software modules. The application 26 may be implemented in firmware, hardware or any combination thereof. The application 26 further includes a cloud application 27. The plural target network devices 12, 14, 16 may also include a plug-in 28 for a browser with plural software modules which communicates with applications 26 and 27.

The target network devices 12, 14, 16 are in communications with a cloud communications network 18 via one or more wired and/or wireless communications interfaces. The cloud communications network 18 includes, but is not limited to, communications over a wire connected to the target network devices, wireless communications, and other types of communications using one or more communications and/or networking protocols. The cloud communications network 18 includes one or more public cloud communications network and/or one or more private cloud communications network and/or plural combinations thereof.

Plural server network devices 20, 22, 24 (only three of which are illustrated) each with one or more processors and a computer readable medium include one or more associated databases 20', 22', 24'. The plural network devices 20, 22, 24 are in communications with the one or more target devices 12, 14, 16 via the cloud communications network 18.

The plural server network devices 20, 22, 24 include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24 also include, but are not limited to, network servers used for cloud computing providers, etc.

The cloud communications network 18 includes, but is not limited to, a wired and/or wireless communications network comprising: the Internet, an intranet, a Local Area Network (LAN), a LAN (WiLAN), a Wide Area Network (WAN), a Metropolitan Area Network (MAN), a Public Switched Telephone Network (PSTN) and other types of wired and/or wireless communications networks.

The cloud communications network 18 may include one or more gateways, routers, bridges, switches and/or edge server network device. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.). An edge server is a device that receives transmitted messages at an edge of a selected network and determines if the received messages should be forwarded to devices within the selected network.

In one embodiment of the present invention, the wired and wireless interfaces include wired and wireless interfaces and corresponding networking protocols for wired connections to the computer network 18 including, a Public Switched Telephone Network (PSTN) or a cable television network (CATV) including HDTV that connect the target network devices 12, 14, 16 via one or more twisted pairs of copper wires, digital subscriber lines (e.g. DSL, ADSL, VDSL, etc.) coaxial cable, fiber optic cable, other connection media or other wired connection interfaces. The PSTN is any public switched telephone network provided by AT&T, GTE, Sprint, MCI, SBC, Verizon and others.

The computer network 18 may also include a paging and wireless messaging network, a wireless cellular telephone network, a Packet Cellular Network (PCN), Global System for Mobile Communications, (GSM), Generic Packet Radio Services (GPRS), network/Personal Communications Services network (PCS), a Cellular Digital Packet Data (CDPD), Wireless Application Protocol (WAP), Digital Audio Broadcasting (DAB) network or other types of computer networks.

The wireless cellular telephone network includes, but is not limited to Code Division Multiple Access (CDMA), Time Division Multiple Access (TDMA), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, fax, caller ID, Internet access, and e-mail.

As is known in the art, SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network (PCN) includes various types of packetized cellular data.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (WiFi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the target network devices 14, 16 include a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, WiFi is a type of 802.11xx interface, whether 802.11b, 802.11a, dual-band, etc. WiFi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

Security and Encryption

Devices and interfaces of the present invention include plural security and/or encryption methods for secure communications via the computer network 18. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and designation at the start of establishing a protocol session. The SSL 2.0 protocol specification, by Kipp E. B. Hickman, 1995 is incorporated herein by reference.

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

The target network devices 12, 14, 16 include a protocol stack with multiple layers based on the Internet Protocol or Opens Systems Interconnection (OSI) reference model. The protocol stack includes, but is not limited to, Transmission Control Protocol (TCP), User Datagram Protocol (UDP), Internet Protocol (IP), Hypertext Transfer Protocol (HTTP), Simple Mail Transfer Protocol (SMTP), Post Office Protocol version 3 (POP3), Internet Mail Access Protocol (IMAP), instant-messaging (IM), Rich Site Summary (RSS), ATOM and other protocols.

TCP provides a connection-oriented, end-to-end reliable protocol designed to fit into a layered hierarchy of protocols that support multi-network applications. For more information on TCP 58 see ITEF RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Really Simple Syndication or Rich Site Summary (RSS) is a family of content distribution and republication (i.e., syndication) protocols primarily used by news sites and weblogs.

The Rich Site Summary (RSS) is also know as RSS 0.91, 0.92 and RSS 2.x. The Resource Description Framework (RDF) Site Summary (also RSS) is based on Netscape's RSS 0.90, which uses the World Wide Web Consortium (W3C) Resource Description Framework Standard known as RSS 1.x.

RSS provides a lightweight eXtensible Markup Language (XML) format designed for sharing electronic information such as news headlines and other electronic content on the World-Wide-Web. RSS was first developed by Netscape to drive channels for the Netscape Netcenter.

RSS defines an XML grammar for sharing electronic information. Each RSS text file contains both static information about a web-site, plus dynamic information about new electronic content, all surrounded by matching start and end tags.

Each RSS channel can contain up to fifteen items. Once information about each item is in RSS format, an RSS-aware program can check the feed for changes and react to the changes in an appropriate way.

RSS was developed built on the idea that a content provider provides an RDF XML page (i.e., RSS feed), and other web users can choose to subscribe to that page. Any time the RDF XML page is updated (e.g., a webblog, etc.) an item to the RSS feed. More information on RSS can be found on the World-Wide-Wed at the Uniform Resource Locator (URL) "blogs.law.harvard.edu/tech/rss."

"ATOM" is an XML-based file format intended to allow lists of related information, known as "feeds," to be synchronized between publishers and consumers. Feeds are composed of a number of items, known as "entries", each with an extensible set of attached metadata. For example, each entry has a title. More information about ATOM is available on the Internet at the URL "atomenabled.org."

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building-and relying-upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

An operating environment for the network devices of the electronic information processing system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Preferred embodiments of the present invention include devices that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

Intelligent Electronic Information Processing from a Target Network Device

Figure 2:
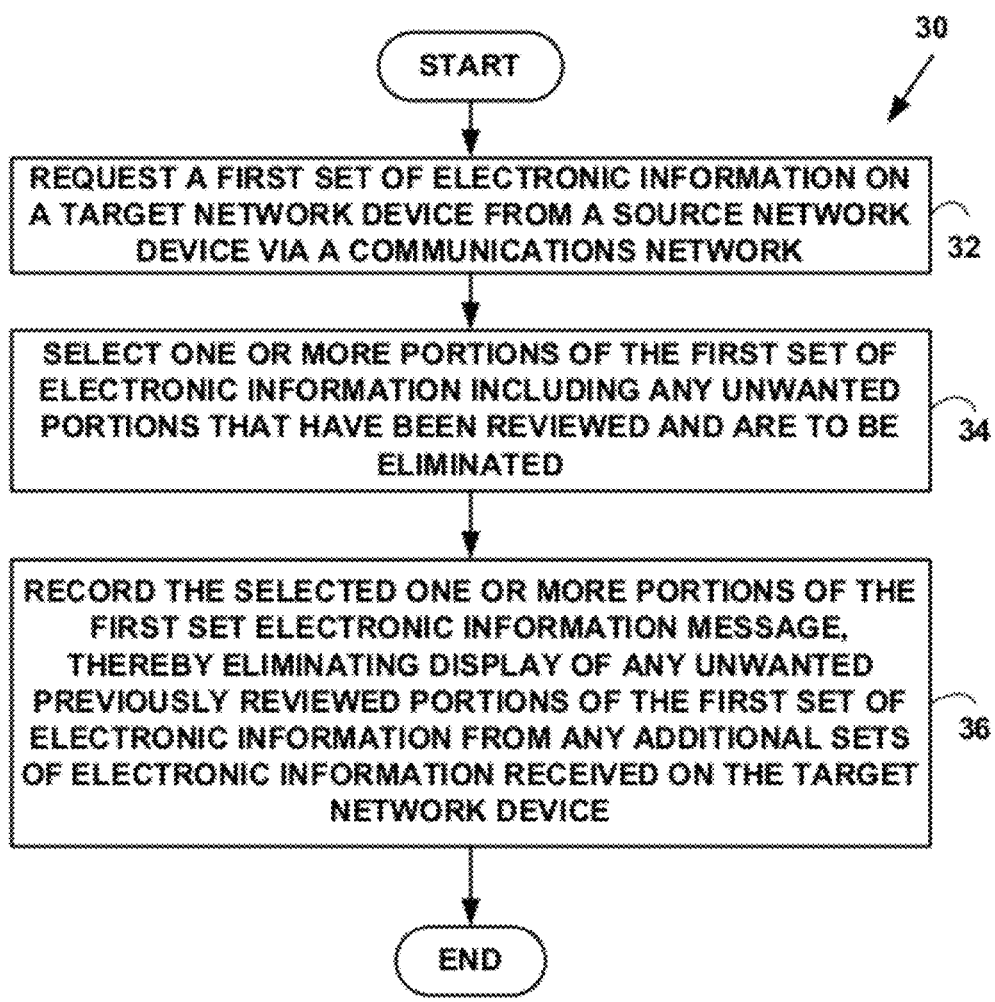
FIG. 2 is a flow diagram illustrating a method for intelligently processing electronic information.

FIG. 2 is a flow diagram illustrating a Method 30 for intelligent electronic information processing. At Step 32, a first set of electronic information is requested on a target network device 12, 14, 16 via a communications network 18 from a source network device 20, 22, 24. At Step 34, one or more portions of the first set of electronic information are selected including any unwanted portions that have been reviewed and are to be eliminated from further display. At Step 36, the selected one or portions of the first set electronic information are recorded thereby eliminating display of any unwanted previously reviewed portions of the first set of electronic information from any additional sets of electronic information received on the target network device 12, 14, 16.

In one embodiment, Method 30 further includes Step 37, a second set of electronic information is requested on the target network device 12, 14, 16 from the source network device 20, 22, 24. The second set of electronic information does not include any portions of the first set of electronic information selected and recorded at Steps 34 and 36. However, the present invention is not limited to Method 30 with Step 37 and can be practiced without Step 37.

Method 30 is illustrated with an exemplary embodiment. However, the present invention is not limited to such an exemplary embodiment and other embodiment can be used to practice the invention.

In such an exemplary embodiment at Step 32, a first set of electronic information (e.g., 40, FIG. 4) is requested on a target network device 12, 14, 16 via a communications network 18 from a source network device 20, 22, 24. In one embodiment, the first set of electronic information 40 search results from a search engine 22, 24. In another embodiment, the first set of electronic information includes a set of electronic auction items such as those provided by Ebay of San Jose, Calif. and others. In another embodiment, the first set of electronic information includes electronic news items, either syndicated or non-syndicated from an RSS or ATOM feed. However, the present information is not limited to such embodiments and other types of electronic information can also be used to practice the invention.

Figure 3:
FIG. 3 is a block diagram illustrating exemplary search engine results for exemplary search term from a search engine.

FIG. 3 is a block diagram 38 illustrating exemplary search engine results 40 for the exemplary search term "led zeppelin posters" from a search engine.

Returning to FIG. 2 at Step 34, one or more portions of the first set of electronic information 40 are selected including any unwanted portions that have been reviewed and are to be eliminated. In one embodiment, the target network devices 12, 14, 16 include an application 26 and/or a plug-in 28 for a web browser that allows a user to mark or check off/flag/mark/delete search results/websites/links/items that the user has previously reviewed from a prior search so that those same results/websites/links/items do not show up on a later search and/or at a later login.

In one embodiment, the application 26 or plug-in 28 for the web browser displays a "radio button" 47 (FIG. 4) for marking unwanted portions of the first set of electronic information. In another embodiment, the application 26 or plug-in 28 for the web browser displays a "check box" 49 (FIG. 4) for marking the unwanted portions. In another embodiment, the application 26 or plug-in 28 for the browser allows a user to select unwanted (or wanted) portions by selecting the unwanted portions with a mouse, keyboard, finger taps, stylus, or other selection input device. However, the present invention is not limited to these exemplary embodiments and other embodiments can also be used to practice the invention.

In one embodiment, the application 26 or the plug-in 28 for the web browser on the target device 12, 14, 16 displays the radio buttons 44, etc., check boxes 51, etc., or accepts selection inputs to select desired portions of the first set of electronic information. In another embodiment, a corresponding server application 26 on the source network device 20, 22, 24 displays the radio buttons 44, check boxes 51, or accepts selection inputs to select desired portions of the first set of electronic information.

Figure 4:
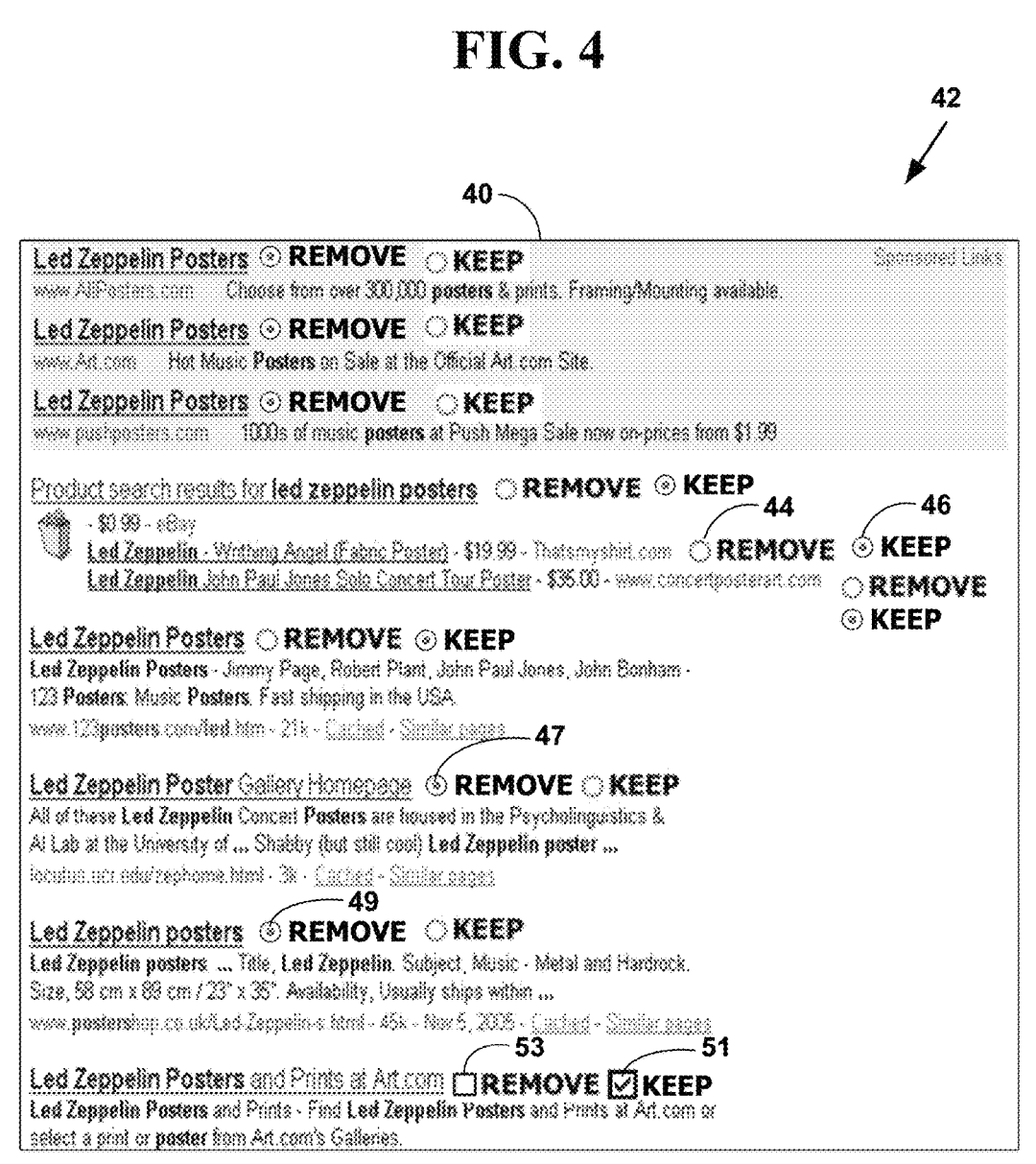

FIG. 4 is a block diagram 42 illustrating the exemplary search engine results 40 from FIG. 3 with exemplary radio buttons 44, 46 displayed for selecting portions of electronic information. A first radio button 44, 47, 49 is used to remove unwanted portions. A second radio button 46 is used to keep desired portions. Either the first radio button 44, or the second radio button 46 can be selected, but not both. A first check box 51 is used to keep desired potions. A second check box 53 is used to remove desired portions. However, the present invention is not limited to this exemplary embodiment and other embodiments can also be used to practice the invention.

Returning to FIG. 2 at Step 36, the selected one or more portions 44, 46 of the first set electronic information 40 from the selection input are recorded thereby eliminating display of any unwanted previously reviewed portions of the first set of electronic information 40 from any additional sets of electronic information received on the target network device 12, 14, 16.

In one embodiment, the selected one or more portions 44, 46 are stored on the target network device 12, 14, 16. In such an embodiment the selected one or more portions 47, 47 are stored on the target network device 12, 14, 16, in a non-transitory computer readable medium in the form of a digital cookie and/or other type of local or remote storage object (e.g., cloud storage object 110, FIG. 9, etc.) by the application 26 or by the plug-in for the browser 28. In another embodiment, the selected one or more portions 47, 49, are stored on the target device 12, 14, 16 in a data structure and/or data file and/or other local or remote storage object in the application 26 or the plug-in for the browser 28. In another embodiment, the selected one or more portions 47, 49 are stored on the source network device 20, 22, 24.

At Step 37, a second set of electronic information 52 (FIG. 5) is requested on the target network device 12, 14, 16 from the source network device 20, 22, 24, wherein the second set of electronic information 52 does not include any portions 47, 49 of the first set of electronic information 40 selected and recorded.

In one embodiment, the application 26 or the plug-in for the web browser 28 uses the digital cookie and/or data structure and/or data file and/or other local or remote storage object to compare any subsequent sets of electronic information 52 requested by the target device 12, 14, 16 with previously viewed and recorded portions 47, 49 from the first set of electronic information 40. Any previously viewed and recorded portions 47, 49 are not displayed on the target device 12, 14, 16 when any subsequent sets of electronic information 52 are displayed.

In another embodiment, the source network devices 20, 22, 24 uses the recorded information 47, 49 to compare or data structure to compare any subsequent sets of electronic information 52 requested by the target device 12, 14, 16 with previously viewed and recorded portions from the first set of electronic information. Any previously viewed and recorded portion 47, 49 s are not forwarded for display on the target device 12, 14, 16.

Figure 5:
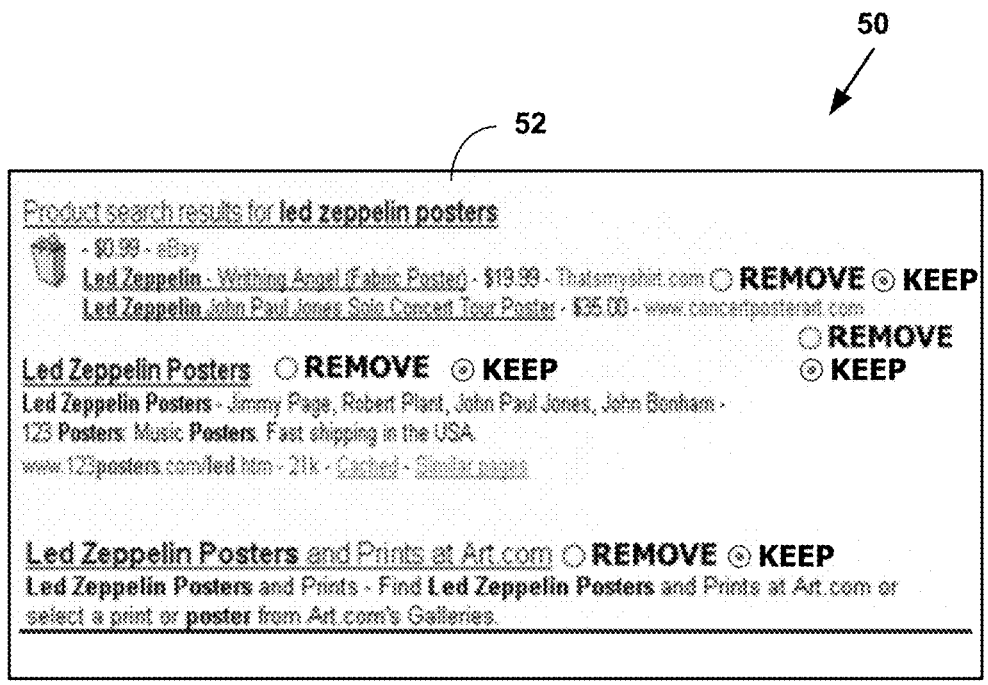
FIG. 5 is a block diagram including a second set of electronic information that does not include any portions of the first set of electronic information selected and recorded from FIG. 3.

FIG. 5 is a block diagram 50 including a second set of electronic information that does not include any portions 47, 49 of the first set of electronic information 40 selected and recorded.

As Method 30 illustrates, a user of a target device 12, 14, 16 could perform a search on a search engine and review certain items within that search. The user might get interrupted or not complete his/her review of the search results at that time. When the user returns to the search results at a later time or performed the same search only saved portions or new portions would be displayed for the user. Any previously viewed and discarded portions would not be displayed for the user as is illustrated in FIG. 5. As FIG. 5 also illustrates, Method 30 can also be applied to the second set of electronic information and any additional sets of electronic information requested. This application of Method 30 allows the search results to be iteratively filtered and saved.

A user of a target device 12, 14, 16 could have plural different login accounts to access the source network devices 20, 22, 24. Method 30 allows the search results with the previously viewed and discarded portions to be used across the plural login accounts. If a user performs a search on a first target device 12 and reviews and discards portions of the first set of electronic information and at a later time desires to use the same search results on a second target network device 14, Method 30 is used to allow the same search results to be used across plural target network devices 12, 14.

Intelligent Electronic Information Processing from a Source Network Device

Figure 6:
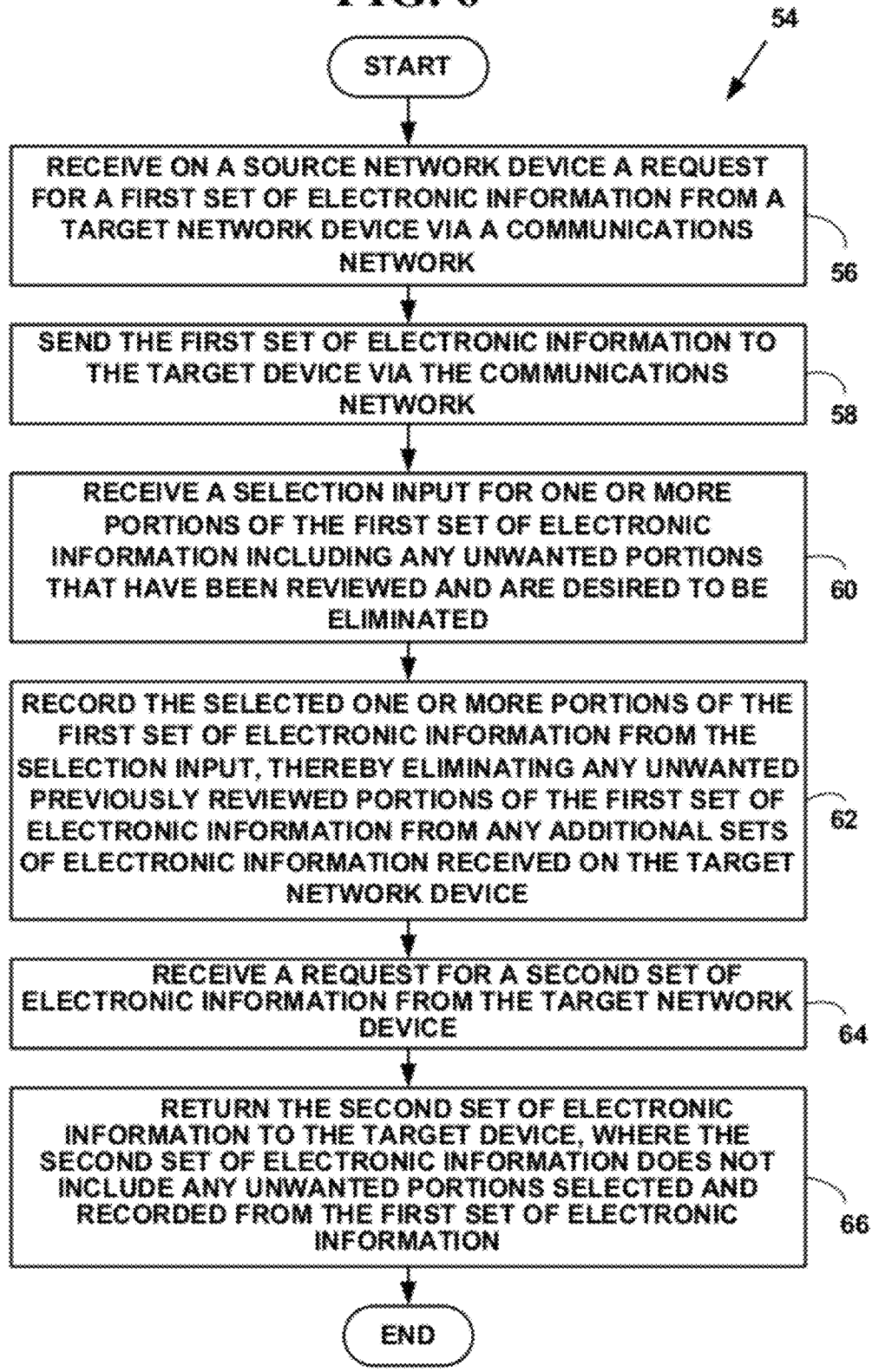
FIG. 6 is a flow diagram illustrating a method for intelligent electronic information processing.

FIG. 6 is a flow diagram illustrating a Method 54 for intelligent electronic information processing. At Step 56, a request is received on a source network device 20, 22, 24 for a first set of electronic information from a target network device 12, 14, 16 via a communications network 18. At Step 58, the first set of electronic information is sent to the target device 12, 14, 16 via the communications network 18. At Step 60, a selection input is received for one or more portions of the first set of electronic information including any unwanted portions that have been reviewed and are to be eliminated from further display. At Step 62, the selected one or more portions of the first set of electronic information from the selection input are recorded, thereby eliminating any unwanted previously reviewed portions of the first set of electronic information from being displayed with any additional sets of electronic information received on the target network device 12, 14, 16. At Step 64, a request is received for a second set of electronic information from the target network device 12, 14, 16. At Step 66, the second set of electronic information is returned to the target device 12, 14, 16. The second set of electronic information does not include any unwanted portions selected and recorded from the first set of electronic information.

Method 54 is illustrated with an exemplary embodiment. However, the present invention is not limited to such an exemplary embodiment and other embodiment can be used to practice the invention.

In such an exemplary embodiment at Step 56, a search engine request, electronic auction request, syndicated or non-syndicated news request, etc. is received on a source network device 20, 22, 24 for a first set of electronic information from a target network device 12, 14, 16 via a communications network 18.

At Step 58, the first set of electronic information 40 is sent to the target device 12, 14, 16 via the communications network 18. In one embodiment, Step 58 includes displaying plural graphical radio buttons 44, 46, a plural graphical check boxes 51, 53 or accepting one or more selection inputs for one or more portions of the first set of electronic information 40 from an application 26 on the source network device 20, 22, 24.

In another embodiment, Step 60 includes receiving a selection input created by displaying plural graphical radio buttons 44, 46, plural graphical check boxes 51, 53 or accepting one or more selection inputs for one or more portions of the first set of electronic information from an application 26 or a browser plug-in 28 on the target network device 12, 14, 16.

At Step 62, a selection input is received for one or more portions 47, 49 of the first set of electronic information 40 including any unwanted portions that have been reviewed and are desired to be eliminated from being displayed.

At Step 64, the selected one or more portions 47, 49 of the first set of electronic information 40 from the selection input are recorded, thereby eliminating any unwanted previously reviewed portions 47, 49 of the first set of electronic information from being displayed with any additional sets of electronic information received on the target network device 12, 14, 16. In one embodiment, Step 60 includes recording the selected one or more portions 47, 49 of the first set of electronic information 40 on the source network device 20, 22, 24.

In another embodiment Step 62 includes sending a message to the target network device 12, 14, 16 requesting recording of the selected one or more portions 47, 49 of the first set of electronic information 40 on the target network device 12, 14, 16. In another embodiment, the recording of the selected one or more portions of the first set of electronic information is automatically recorded on the target network device 12, 14, 16. As was discussed above, the one or more portions of the first set of electronic information 40 are recorded in a digital cookie and/or in a data structure and/or in another local or remote storage object in the application 26 or the plug-in for the browser on the target network device 12, 14, 16.

At Step 64, a request is received for a second set of electronic information 52 from the target network device 12, 14, 16. At Step 64, the second set of electronic information 52 is returned to the target device 12, 14, 16. The second set of electronic information 52 does not include any portions 47, 49 selected and recorded from the first set of electronic information 40 for display.

Methods 30 and 54 can also be used for ticket purchasing for events and transportation (e.g., airline tickets, bus tickets, train tickets, rental cars, etc.) and for reserving lodging (e.g., hotel rooms, etc.). For example, when a user desires to buy tickets for a popular concert, many different ticket purchasing sites may be provided (e.g., tickets.com, e-tickets.com, cheaptickets.com, ticketmaster.com, etc.) Many of these different ticket purchasing sites have a similar looking interface. The methods and system described herein can be used to allow a user to review ticket prices and seat locations on many different ticket purchasing sites and keep track of what sites and ticket packages were reviewed on travel sites such as expedia.com, orbitz.com, hotels.com, etc.

Cloud Computing Networks

"Cloud computing" is a model for enabling, on-demand network access to a shared pool of configurable computing resources (e.g., public and private networks, servers, storage, applications, and services) that are shared, rapidly provisioned and released with minimal management effort or service provider interaction. An exemplary cloud computing network includes the cloud communications network 18 comprising plural different networks described herein.

Figure 7:
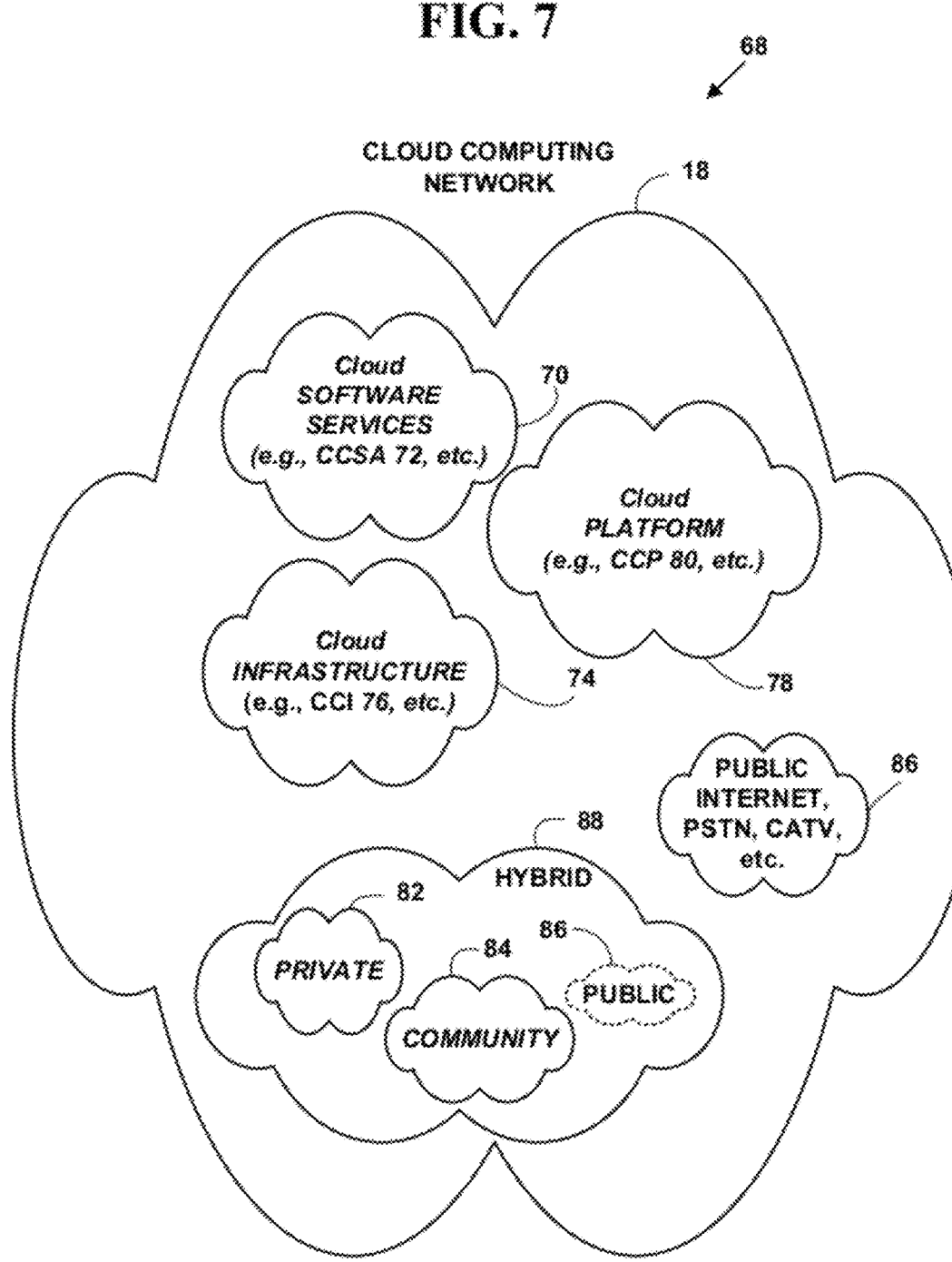
FIG. 7 is a block diagram illustrating an exemplary cloud communications network.

FIG. 7 is a block diagram 68 illustrating an exemplary cloud communications network 18. However, the present invention is not limited to this cloud computing model and other cloud computing models can also be used to practice the invention. The exemplary cloud communications network includes both wired and/or wireless components of public and private networks.

This exemplary cloud computing model for intelligent electronic information processing promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand electronic content retrieval services. Electronic content retrievers can unilaterally provision computing capabilities, such as server time and network storage, as needed automatically without requiring human interaction with each network server on the cloud communications network 18.
Broadband network access. Electronic content retrieval capabilities are available over plural broadband communications networks and accessed through standard mechanisms that promote use by heterogeneous thin or thick client platforms 12, 14, 16 (e.g., mobile phones, smart phones, tablet computers, laptops, PDAs, etc.). The broadband network access includes high speed network access such as 3G and/or 4G wireless and/or wired and broadband and/or ultra-broad band (e.g., WiMAX, etc.) network access.
Resource pooling. Electronic content retrieval computing resources are pooled to serve multiple requesters using a multi-tenant model, with different physical and virtual resources dynamically assigned and reassigned according to electronic content retrieval demand. There is location independence in that an requester of electronic content has no control and/or knowledge over the exact location of the provided by the electronic content retrieval resources but may be able to specify location at a higher level of abstraction (e.g., country, state, or datacenter). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for electronic content retrieval. To the electronic content retriever, the electronic content capabilities available for provisioning appear to be unlimited and can be used in any quantity at any time.
Measured Services. Cloud computing systems automatically control and optimize resource use by leveraging a metering capability at some level of abstraction appropriate to the type of electronic content retrieval service (e.g., storage, processing, bandwidth, custom electronic content retrieval applications, etc.). Electronic content retrieval usage is monitored, TABLE 1-continued controlled, and reported providing transparency for both the electronic content provider and the electronic content requester of the utilized electronic content retrieval service.

Exemplary cloud computing service models illustrated in FIG. 7 appear in Table 2. However, the present invention is not limited to these service models and more, fewer or other service models can also be used to practice the invention.

TABLE 2

Cloud Computing Software Applications 70 for an Electronic Content Retrieval Service (CCSA 72). The capability to use the provider's applications 26, 27 running on a cloud infrastructure 74. The cloud computing applications 27 are accessible from the server network devices 20, 22, 24 from various client target network devices 12, 14, 16 through a thin client interface such as a web browser plug-in 28, etc. The user does not manage or control the underlying cloud infrastructure 74 including network, servers, operating systems, storage, or even individual application 26, 27 capabilities, with the possible exception of limited user-specific application configuration settings.
Cloud Computing Infrastructure 74 for the an Electronic Content Retrieval Service (CCI 76). The capability provided to the user is to provision processing, storage, networks 18, 82, 84, 86, 88 and other fundamental computing resources where the consumer is able to deploy and run arbitrary software, which can include operating systems and applications 26, 27. The user does not manage or control the underlying cloud infrastructure 76 but has control over operating systems, storage, deployed applications, and possibly limited control of select networking components (e.g., host firewalls, etc.).
Cloud Computing Platform 78 for the an Electronic Content Retrieval Service (CCP 80). The capability provided to the user to deploy onto the cloud infrastructure 76 created or acquired applications created using programming languages and tools supported servers 20, 22, 24, etc . . . The user not manage or control the underlying cloud infrastructure 76 including network, servers, operating systems, or storage, but has control over the deployed applications 26, 27 and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 82. The cloud network infrastructure is operated solely for an electronic content retrieval organization. It may be managed by the electronic content retrieval organization or a third party and may exist on premise or off premise.
Community cloud network 84. The cloud network infrastructure is shared by several different organizations and supports a specific electronic content retrieval community that has shared concerns (e.g., mission, security requirements, policy, compliance considerations, etc.). It may be managed by the different organizations or a third party and may exist on premise or off premise.
Public cloud network 86. The cloud network infrastructure such as the Internet, PSTN, CATV, etc. is made available to the general public or a large industry group and is owned by one or more organizations selling cloud services.
Hybrid cloud network 88. The cloud network infrastructure 76 is a composition of two and/or more cloud networks 18 (e.g., private 82, community 84, and/or public 86, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 72 for electronic content retrieval takes full advantage of the cloud paradigm by being service oriented with a focus on statelessness, low coupling, modularity, and semantic interoperability for electronic content retrieval.

In on exemplary embodiment, the application 26, 27, offers additional cloud services. The application 26, 27 offers the cloud computing Infrastructure 74, 76 as a cloud Service 70 (IaaS), including a cloud software service 72, the cloud Platform 78, 80 as a cloud Service 70 (PaaS) including a cloud software service 72, or offers Specific cloud software services as a cloud Service 70 (SaaS) including a cloud software service. The IaaS, PaaS and SaaS include one or more of cloud services 70 comprising networking, storage, server network device, virtualization, operating system, middleware, run-time, data and/or application services, or plural combinations thereof, on the cloud communications network 18.

Internet Television Services

The applications 26, 27 provide television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

However, the present invention is not limited to such Internet Television services and more, fewer and/or other Internet Television services can be used to practice the invention.

Search Engine Services

The applications 26, 27 provide general search engine services. A search engine is designed to search for information on a cloud communications network 18 such as the Internet including World Wide Web servers, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

The applications 26, 27 provide general search engine services as stand alone services. In another embodiment, the applications 26, 27 provide general search engine services by interacting with one or more other public search engines (e.g., GOOGLE, BING, YAHOO, etc.) and/or private search engine services.

The applications 26, 27 provide specialized search engine services, such as vertical search engine services by interacting with one or more other public vertical search engines (e.g., GALAXY.COM, etc.) and/or private search engine services However, the present invention is not limited to such general and/or vertical search engine services and more, fewer and/or other general search engine services can be used to practice the invention.

Social Networking Services

In one embodiment, the applications 26, 27 provide one more social networking services including to/from one or more social networking web-sites (e.g., FACEBOOK, U-TUBE, TWITTER, MY-SPACE, MATCH.COM, E-HARMONY, GROUP ON, SOCIAL LIVING, etc.). The social networking web-sites also include, but are not limited to, social couponing sites, dating web-sites, blogs, RSS/ATOM feeds, and other types of information web-sites in which messages can be left or posted for a variety of social activities.

However, the present invention is not limited to the social networking services described and other public and private social networking services can also be used to practice the invention.

Cloud Storage

Cloud storage of desired electronic content on a cloud communications network 18 includes agility, scalability, elasticity and multi-tenancy. Although a storage foundation may be comprised of block storage or file storage such as that exists on conventional networks, cloud storage is typically only exposed to requesters of desired electronic content as "cloud storage objects" (e.g., 110, FIG. 9, etc.).

Cloud storage objects 110 have proven experimentally to be a highly scalable, distributed, available and reliable layer of abstraction that also minimizes the limitations of common file systems. Cloud storage objects 110 also provide low latency and low storage and transmission costs.

Cloud storage objects 110 are comprised of plural distributed storage locations, but function as a single storage object, are highly fault tolerant through redundancy and provide distribution of desired electronic content across public communication networks 86, and one or more private networks 82, community networks 44 and hybrid networks 88 of the cloud communications network 18. Cloud storage objects 110 are also highly durable because they also initiate creation of copies of portions of desired electronic content across such networks 82, 84, 86, 88 of the cloud communications network 18. Cloud storage objects 110 are stored on one or more of the 82, 84, 86, 88 networks of the cloud communications network 18 and/or on the target network device 12, 14, 16. Cloud storage objects 110 are transparent to a requester of desired electronic content and are managed by cloud computing application 26, 27.

Cloud storage objects 110 comprise plural storage objects distributed on cloud source network devices 20, 22, 24, and/or other storage devices (e.g., gateway, router, bridge, switch, edge server, etc.) and/or the target network devices 12, 14, 16 with a size up to hundreds of terabytes, each accompanied by with a few kilobytes of metadata. Cloud storage objects 110 are organized into and each identified by a unique identifier unique across the whole cloud communications network 18. However, the present invention is not limited to the cloud storage objects described, and more fewer and other types of cloud storage objects can be used to practice the invention.

Cloud storage objects 110 present a single unified namespace or object-space and manages desired electronic content by user or administrator-defined policies storage and retrieval policies.

Cloud storage objects 110 include Representational state transfer (REST), Simple Object Access Protocol (SOAP) and/or an Application Programming Interface (API) and/or other types of cloud storage objects. However, the present invention is not limited to the cloud storage objects described, and more fewer and other types of cloud storage objects can be used to practice the invention.

REST characterizes and constrains macro-interactions of the four components of a cloud communications network 18, namely origin servers, gateways, proxies and clients, without imposing limitations on the individual participants.

SOAP is a protocol specification for exchanging structured information in the implementation of cloud services. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

An API is a particular set of rules and specifications that software programs can follow to communicate with each other. It serves as an interface between different software programs and facilitates their interaction.

Intelligent Electronic Information Processing with Cloud Computing

FIGS. 8A, 8B and 8C are a flow diagram illustrating a Method 90 for intelligent electronic information processing with cloud computing. In FIG. 8A at Step 92, a first request message is sent requesting a first set of electronic information from a cloud application on a target network device with one or more processors to a cloud source network device with one or more processors via a cloud communications network comprising: one or more public communication networks, one or more private networks, one or more community networks and one or more hybrid networks. At Step 94, the cloud application on the target network device receives a first response message including the requested first set of electronic information from the cloud source network device via the cloud communications network. The one or more portions of the first set of electronic information are retrieved by the cloud source network device from one or more of the one or more public, private, community or hybrid networks on the cloud communications network. At Step 96, the cloud application on the target network device receives one or more selection inputs for one or more portions of the first set of electronic information including any unwanted portions that have been reviewed and are to now be eliminated from display on the target network device. In FIG. 8B at Step 98, a second request message is sent from the cloud application on the target network device to the cloud source network device via the cloud communications network including an indication to record the selected one or more unwanted portions of the first set electronic information on the cloud communications network thereby eliminating any unwanted previously reviewed portions of the first set of electronic information from further display with any additional sets of electronic information received on the cloud application on the cloud application on the target network device. The cloud source network device requests contents of the second request message be recorded as a cloud storage object on other cloud source network devices on the one or more public, private, community or hybrid networks on the cloud communications network. The cloud storage object comprises plural storage locations distributed across the cloud communications network but functions as a single storage object. The cloud application on the target network device cannot determine which other cloud source network devices on the one or more public, private, community or hybrid networks on the cloud communications network may have recorded the contents of the second message in the cloud storage object, thereby providing security and privacy for recording requests made by the cloud application on the target network device. At Step 100, a third request message is sent requesting a second set of electronic information from the cloud application on the target network device to the cloud source device via the cloud communications network. In FIG. 8C at Step 102, the cloud application on the target network device receives a second response message including the requested second set of electronic information from the cloud source network device via the cloud communications network. One or more portions of the second set of electronic information are retrieved by the cloud source network device from one or more of the one or more public, private, community or hybrid networks on the cloud communications network on which the one or more portions are separately stored. At Step 104, the cloud application on the target network device displays the received second set of electronic information. The received second set of electronic information does not include any unwanted previously reviewed portions selected and recorded from the first set of electronic information. At Step 106, the recorded selected one or more unwanted portions of the first set electronic information in the cloud storage object are used in real-time for plural other target network devices from a same user of the target network device and from plural different login accounts from the same user on plural server network devices on any of the one or more public, private, community or hybrid networks on the cloud communications network, thereby removing any unwanted previously reviewed portions of the first set of electronic information from display across the plural other target network devices from the same user and across the plural different logins from the same user when used from anywhere on the cloud communications network.

Method 90 is illustrated with an exemplary embodiment. However, the invention is not limited to this embodiment and other embodiments can also be used to practice the invention.

In such an exemplary embodiment in FIG. 8A at step 92, At Step 92, a first request message is sent requesting a first set of electronic information (e.g., 40, FIG. 3, etc.) from a cloud application 26, 27 on a target network device 12, 14, 16 with one or more processors to a cloud source network device 20, 22, 24 with one or more processors via a cloud communications network 18 comprising: one or more public communication networks 86, one or more private networks 82, one or more community networks 84 and one or more hybrid networks 88.

The cloud communications network 18 provides on-demand self-service, broad network access, resource pooling, rapid elasticity and measured electronic services for electronic storage and retrieval.

The cloud source network device includes a server network device 20, 22, 24. In another embodiment, the cloud source network device includes a gateway and/or router and/or switch and/or edge server network device each with one or more processor.

In one embodiment, the cloud source network device 20, 22, 24 and/or the target network devices 12, 14, 16 include a wireless networking interface comprising 4$^{th}$ generation (4G) Worldwide Interoperability for Microwave Access (WiMax) Long Term Evolution (LTE) wireless interface in communications with the cloud communications network 18. However, the present invention is not limited to this embodiment and other types of wireless networking interfaces can be used to practice the invention.

The cloud computing application 26, 27 includes an electronic content retrieval/storage service CCS 72, a cloud computing platform CCP 80 for the electronic content retrieval/storage service and a cloud computing infrastructure CCI 76 for the electronic content retrieval/storage service.

The cloud communications network 18 includes an on-demand electronic content retrieval/storage service, broadband network access, resource pooling, rapid elasticity and measured network services for electronic content retrieval/storage services.

The plural request messages are plural search engine query messages for public and/or private search engines. In another embodiment, the plural request messages are plural world-wide-web and/or other electronic information server requests. In another embodiment, the plural request message include Internet TV request messages. In another embodiment, the plural request messages include social media requests messages.

The first set of electronic information 40 includes electronic search engine results, electronic auction results, syndicated electronic news items, non-syndicated electronic news items, tickets for events and transportation or reservations for lodging.

However, the present invention is not limited to such request messages and more, fewer and/or other types of request messages can be used to practice the invention.

The first set of electronic information 40 includes electronic search engine results, electronic auction results, syndicated electronic news items, non-syndicated electronic news items, tickets for events and transportation or reservations for lodging. However, the present invention is not limited to such electronic information and more, fewer or other types of electronic information can be used to practice the invention.

In on exemplary embodiment, the application 26, 27, offers additional cloud services including the IaaS, PaaS and SaaS described above and including one or more of cloud services 70 comprising networking, storage, server network device, virtualization, operating system, middleware, runtime, data and/or application services, or plural combinations thereof, on the cloud communications network 18.

At Step 94, the cloud application 26, 27 on the target network device 12, 14, 16 receives a first response message including the requested first set of electronic information 40 from the cloud source network device 20, 22, 24 via the cloud communications network 18. The one or more portions of the first set of electronic information 40 are retrieved by the cloud source network device from one or more of the one or more public 86, private 82, community 84 or hybrid 86 networks on the cloud communications network 18.

At Step 96, the cloud application 26, 27 on the target network device 12, 14, 16 receives one or more selection inputs (e.g., 44, 46, FIG. 4, etc.) for one or more portions of the first set of electronic information 40 including any unwanted portions (e.g., 47, 49, FIG. 4, etc.) that have been reviewed and are to be eliminated from display on the target network device 12, 14, 16.

In one exemplary embodiment Step 96 includes receiving one or more selection inputs from displaying plural graphical radio buttons (e.g., 44, 46, etc. FIG. 4), plural graphical check boxes (e.g., 51, FIG. 4, etc.) and/or finger taps, and/or other keyboard and/or stylus inputs on the received first set of electronic information from the cloud application 26, 27 on the target network device 12, 14, 16, on a graphical user interface (GUI) displayed on a display portion of the target network device 12, 14, 16. However, the present invention is not limited to this embodiment and more, fewer or other types of selectable entities can be used to generate selection inputs and to practice the invention.

FIG. 9 is a block diagram 108 illustrating an exemplary cloud storage object 110. The cloud storage object 110 includes an envelope portion 112, with a header portion 114, and a body portion 116. However, the present invention is not limited to such a cloud storage object 110 and other cloud storage objects and other cloud storage objects with more, fewer or other portions can also be used to practice the invention.

The envelope portion 112 uses unique namespace Uniform Resource Identifiers (URIs) and/or Uniform Resource Names (URNs), and/or Uniform Resource Locators (URLs) unique across the cloud communications network 18 to specify, location and version information and encoding rules used by the cloud storage object 110. For more information, see IETF RFC-3305, Uniform Resource Identifiers (URIs), URLs, and Uniform Resource Names (URNs), the contents of which are incorporated by reference.

The envelope portion 112 of the cloud storage object 110 is followed by a header portion 114. The header portion includes extended information about the cloud storage objects such as authorization and/or transaction information, etc.

The body portion 116 includes methods 118 (i.e., a sequence of instructions, etc.) for using embedded application-specific data in data elements 120 such as the unwanted previously reviewed portions (e.g., 47, 49, etc.) of the first set of electronic information 40 an/or distributed data elements 122. The body portion 116 typically includes only one portion of plural portions of the application-specific data so the cloud storage object 110 can provide distributed, redundant fault tolerant, security and privacy features described herein.

Returning to FIG. 8B at Step 98, a second request message is sent from the cloud application 26, 27 on the target network device 12, 14, 16 to the cloud source network device 20, 22, 24 via the cloud communications network 18 including an indication to record the selected one or more unwanted portions of the first set electronic information 40 on the cloud communications network 18 thereby eliminating any unwanted previously reviewed portions (e.g., 47, 49, etc.) of the first set of electronic information 40 from further display with any additional sets of electronic information received on the cloud application 26, 27 on the target network device 12, 14, 16. The cloud source network device 20, 22, 24 requests contents of the second request message be recorded as a cloud storage object 110 on other cloud source network devices 20, 22, 24 on the one or more public 88, private 82, community 84 or hybrid 86 networks on the cloud communications network 18.

The cloud storage object 108 comprises plural storage locations distributed across the cloud communications network 18 but functions as a single storage object. The cloud application 26, 27 on the target network device 20, 22, 24 cannot determine which other cloud source network devices 20, 22, 24 on the one or more public 88, private 82, community 84 or hybrid 86 networks on the cloud communications network 18 may have recorded the contents of the second message in the cloud storage object 110, thereby providing security and privacy for recording requests made by the cloud application 26, 27 on the target network device 12, 14, 16.

The cloud storage object 110 includes one or more REpresentational State Transfer (REST) or Simple Object Access Protocol (SOAP) cloud storage objects.

Step 98 includes securely sending the second request message with a pre-determined security or encryption method including a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), or a Transport Layer Security (TLS) security or encryption method discussed above.

At Step 100, a third request message is sent requesting a second set of electronic information (e.g., 50, FIG. 5, etc.) from the cloud application 26, 27 on the target network device 12, 14, 16 to the cloud source network device 20, 22, 24 via the cloud communications network 18.

In FIG. 8C at Step 102, the cloud application 26, 27 on the target network device receives a second response message including the requested second set of electronic information 52 from the cloud source network device via the cloud communications network 18. One or more portions of the second set of electronic information 52 are retrieved by the cloud network source device 20, 22, 24 using the cloud storage object 110 from any of the one or more public 86, private 82, community 84 or hybrid 86 networks on the cloud communications network 18 on which the one or more portions are separately stored.

At Step 104, the cloud application 26, 27 on the target network device 12, 14, 16 displays the received second set of electronic information (e.g., 52, FIG. 5, etc.). The received second set of electronic information 52 does not include any unwanted previously reviewed portions selected (e.g., 47, 49) and recorded from the first set of electronic information 40.

At Step 106, the recorded selected one or more unwanted portions of the first set electronic information 40 in the cloud storage object 110 is are used in real-time for plural other target network devices 12, 14, 16 from a same user of the target network device 12, 14, 16 and from plural different login accounts from the same user on plural server network devices 20, 22, 24 on any of the one or more public 88, private 82, community 84 or hybrid 86 networks on the cloud communications network 18, thereby removing any unwanted previously reviewed portions 47, 49 of the first set of electronic information 40 from display across the plural other target network devices 12, 14, 16 from the same user and across the plurality of different logins from the same user when used from anywhere on the cloud communications network 18.

For the methods and system described here, "real-time" includes, but is not limited to an activity that completed in one (1) second or less after the activity is requested. However, the present invention is not limited to real-time activities of one second or less and real-time activities can be completed in less than one second and more than one second (e.g., up to 5-20 seconds, etc.) after the activity is requested.

For example using Method 90, a user may be using a first target network device (e.g., tablet computer 12, etc.) and have made a first search engine query (e.g., 40, FIG. 4, etc.) for Led Zepplin posters. The same user may then have to go to work and later in the day use his/her smart phone (e.g., 14, etc.) to continue his/her search for a Led Zepplin poster. At that time, a second search engine query is sent and the second set of results (e.g., 52, FIG. 5, etc.) is returned to the smart phone 14 by the cloud application 26, 27 and the same user can continue his/her search without the previously viewed and discarded items (e.g., without items 47, 49, etc. FIG. 4). For the sake of this example, assume no additional items were discarded from the second set of results 52. A little bit later, the same user desires to ask some friends which Led Zepplin poster he/she should purchase and logs into several different social media sites (e.g., FACEBOOK, TWITTER, etc.) on several different logins with his/her smart phone 14 and makes a third query on each login. At that time, the second set of results (e.g., 52, FIG. 5, etc.) are again returned to the smart phone 14 and the cloud application 26, 27 so the same user can post the results on his/her social media account for input from his/her friends. However, the present invention is not limited to this example and other the present invention can be practiced with other devices and other electronic information requests.

In another embodiment, Method 90 further includes an additional Step 107, wherein the recorded selected one or more unwanted portions of the first set electronic information 40 in the cloud storage object 110 is are also used in real-time for plural other target network devices 12', 14', 16' different from the target network device 12, 14, 16, from plural different users of the other target network device 12, 14, 16 and from plural different login accounts from the plural different users on plural server network devices 20, 22, 24 on any of the one or more public 88, private 82, community 84 or hybrid 86 networks on the cloud communications network 18, thereby also removing any unwanted previously reviewed portions 47, 49 of the first set of electronic information 40 from display across the plural other target network devices 12, 14, 16 from the plural different users and across the plural different login accounts from the plural different users when used from anywhere on the cloud communications network 18.

FIG. 10 is a flow diagram illustrating a Method 124 for intelligent electronic information processing with cloud computing. At Step 126, a fourth request message requesting a copy of cloud storage object stored on the cloud communications network is sent from the cloud application on the target network device to the cloud source network device via the cloud communications network. At Step 128, the cloud application on the target network device receives a third response message including the requested copy of the cloud storage object from the cloud source network device via the cloud communications network. At Step 130, the cloud application on the target network device stores the cloud storage object received in the third response message in a non-transitory computer readable medium on the target network device. At Step 132, the cloud storage object is used in real-time from the non-transitory computer readable medium from the cloud application on the target network device from the target network device and from plural other target network devices from the same user of the target network device and the cloud storage object from the non-transitory computer readable medium on the target network device is used from the plural different login accounts from the same user, thereby removing any unwanted previously reviewed portions of the first set of electronic information from display from the target network device, across the plural other target network devices and across the plural different login accounts from the same user, faster and more efficiently than using the cloud storage object from the cloud communications network.

In one embodiment, Method 124 further includes Step 133, including using in real-time the cloud storage object from the non-transitory computer readable medium from the cloud application on the target network device from plural other target network devices from a plural different users and using cloud storage object from the non-transitory computer readable medium on the target network device from the plural different login accounts from the plural different users, thereby also removing any unwanted previously reviewed portions of the first set of electronic information from display from the plural other target network device and also across the plural different login accounts from the plural different users.

Method 124 is illustrated with an exemplary embodiment. However, the invention is not limited to this embodiment and other embodiments can also be used to practice the invention.

In such an exemplary embodiment at Step 126, a fourth request message requesting a copy of cloud storage object 110 stored on the cloud communications network 18 is sent from the cloud application 26, 27 on the target network device 12, 14, 16 to the cloud source network device 20, 22, 24 via the cloud communications network 18.

At Step 128, the cloud application 26, 27 on the target network device 12, 14, 16 receives a third response message including the requested copy of the cloud storage object 110 from the cloud source network device 20, 22, 24 via the cloud communications network 18.

At Step 130, the cloud application 26, 27 on the target network device 12, 14, 16 stores the cloud storage object received in the third response message in a non-transitory computer readable medium on the target network device 12, 14, 16.

At Step 132, the cloud storage object 110 is used in real-time from the non-transitory computer readable medium from the cloud application 26, 27 on the target network device 12, 14, 16, from the target network device 12, 14, 16 and from plural other target network devices 12', 14' 16' from the same user of the target network device 12, 14, 16 and the cloud storage object from the non-transitory computer readable medium on the target network device 12, 14, 16 is used from the plural different login accounts from the same user, thereby removing any unwanted previously reviewed portions 47, 49 of the first set of electronic information 40 from display from the target network device, across the plural other target network devices 12', 14', 16' and across the plural different login accounts from the same user, faster and more efficiently than using the cloud storage object 110 from the cloud communications network 118.

In one embodiment, the steps of Methods 30 and 54 may used within the steps of Methods 90 and 124. However, the present invention is not limited to such an embodiment and the Methods 90 and 124 may be used without Methods 30 and 54.

The methods and systems described herein allow previously reviewed portions of electronic information to be displayed without reviewed and unwanted portions and is available to and across plural network devices and across plural login accounts for a same user and/or plural different user anywhere on the cloud computing network.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for intelligent electronic information processing with cloud computing comprising:
sending a first request message requesting a first set of electronic information from a cloud application on a target network device with one or more processors to a cloud source network device with one or more processors via a cloud communications network;
receiving on the cloud application on the target network device a first response message including the requested first set of electronic information from the cloud source network device via the cloud communications network;
receiving one or more selection inputs on the cloud application on the target network device to select one or more portions of the first set of electronic information including any unwanted portions that have been reviewed and are to be eliminated from further display on the target network device;
sending a second request message from the cloud application on the target network device to the cloud source network device via the cloud communications network including an indication to record removal of the selected one or more unwanted portions of the first set electronic information on the cloud communications network, wherein the cloud source network device uses recorded information to compare any subsequent sets of electronic information requested by the target network device with previously viewed and recorded portions of sets of electronic information, and
wherein any recorded previously viewed and recorded portions are not forwarded for display on the target network device;
eliminating with the second request message any unwanted previously reviewed portions of the first set of electronic information from further display with any additional sets of electronic information received on the cloud application on the target network device,
wherein the cloud source device requests contents of the second request message be recorded as a cloud storage object on other cloud source network devices on one or more public, private, community or hybrid networks on the cloud communications network,
wherein the cloud storage object comprises a plurality of separate storage locations distributed across the cloud communications network but functions as a single storage object, and
wherein the cloud application on the target network device cannot determine which other cloud source network devices on the one or more public, private, community or hybrid networks on the cloud communications network may have recorded the contents of the second message in the cloud storage object, thereby providing security and privacy for recording requests made by the cloud application on the target network device;
sending a third request message requesting a second set of electronic information from the cloud application on the target network device to the cloud source network device via the cloud communications network,
receiving on the cloud application on the target network device a second response message including the requested second set of electronic information from the cloud source network device via the cloud communications network, wherein one or more portions of the second set of electronic information are retrieved by the cloud source network device using the cloud storage object from any of the one or more public, private, community or hybrid networks on the cloud communications network, and wherein the received second set of electronic information does not include any unwanted previously reviewed portions selected and recorded and removed from the first set of electronic information;
displaying with the cloud application on the target network device the received second set of electronic information, wherein the displayed received second set of electronic information does not include any unwanted previously reviewed portions selected and recorded from the first set of electronic information;
eliminating displaying with the received second set of electronic information on a plurality of other target network devices from a same user of the target network device and from a plurality of different login accounts from the same user on a plurality of server network devices on any of the one or more public, private, community or hybrid networks on the cloud communications network; and
eliminating displaying with the received second set of electronic information across the plurality of other target network devices from the same user and across the plurality of different logins from the same user when any of the target network devices from the same user are used from anywhere on the cloud communications network.

2. A non-transitory computer readable medium on a network device having stored therein a plurality of instructions for causing one or more processor to execute the steps comprising:
sending a first request message requesting a first set of electronic information from a cloud application on a target network device with one or more processors to a cloud source network device with one or more processors via a cloud communications network;
receiving on the cloud application on the target network device a first response message including the requested first set of electronic information from the cloud source network device via the cloud communications network;
receiving one or more selection inputs on the cloud application on the target network device to select one or more portions of the first set of electronic information including any unwanted portions that have been reviewed and are to be eliminated from further display on the target network device;
sending a second request message from the cloud application on the target network device to the cloud source network device via the cloud communications network including an indication to record removal of the selected one or more unwanted portions of the first set electronic information on the cloud communications network, wherein the cloud source network device uses recorded information to compare any subsequent sets of electronic information requested by the target network device with previously viewed and recorded portions of sets of electronic information, and wherein any recorded previously viewed and recorded portions are not forwarded for display on the target network device;

eliminating with the second request message any unwanted previously reviewed portions of the first set of electronic information from further display with any additional sets of electronic information received on the cloud application on the target network device, wherein the cloud source device requests contents of the second request message be recorded as a cloud storage object on other cloud source network devices on one or more public, private, community or hybrid networks on the cloud communications network, wherein the cloud storage object comprises a plurality of separate storage locations distributed across the cloud communications network but functions as a single storage object, and wherein the cloud application on the target network device cannot determine which other cloud source network devices on the one or more public, private, community or hybrid networks on the cloud communications network may have recorded the contents of the second message in the cloud storage object, thereby providing security and privacy for recording requests made by the cloud application on the target network device;

sending a third request message requesting a second set of electronic information from the cloud application on the target network device to the cloud source network device via the cloud communications network, receiving on the cloud application on the target network device a second response message including the requested second set of electronic information from the cloud source network device via the cloud communications network, wherein one or more portions of the second set of electronic information are retrieved by the cloud source network device using the cloud storage object from any of the one or more public, private, community or hybrid networks on the cloud communications network, and wherein the received second set of electronic information does not include any unwanted previously reviewed portions selected and recorded and removed from the first set of electronic information;

displaying with the cloud application on the target network device the received second set of electronic information, wherein the displayed received second set of electronic information does not include any unwanted previously reviewed portions selected and recorded from the first set of electronic information;

eliminating displaying with the received second set of electronic information on a plurality of other target network devices from a same user of the target network device and from a plurality of different login accounts from the same user on a plurality of server network devices on any of the one or more public, private, community or hybrid networks on the cloud communications network; and eliminating displaying with the received second set of electronic information across the plurality of other target network devices from the same user and across the plurality of different logins from the same user when any of the target network devices from the same user are used from anywhere on the cloud communications network.

3. The method of claim 1 further comprising:

using in real-time the recorded selected one or more unwanted portions of the first set electronic information in the cloud storage object for a plurality of other target network devices from a plurality of different users of the target network device and the plurality of other target network devices and from a plurality of different login accounts from the same user and the plurality of different users on a plurality of server network devices on any of the one or more public, private, community or hybrid networks on the cloud communications network, thereby removing any unwanted previously reviewed portions of the first set of electronic information from display across the plurality of other target network devices from the same user and the plurality of different users and across the plurality of different logins from the same user and the plurality of different users when used from anywhere on the cloud communications network.

4. The method of claim 1 further comprising:

sending a fourth request message requesting a copy of cloud storage object stored on the cloud communications network from the cloud application on the target network device to the cloud source network device via the cloud communications network;

receiving on the cloud application on the target network device a third response message including the requested copy of the cloud storage object from the cloud source network device via the cloud communications network;

storing from the cloud application on the target network device the cloud storage object received in the third response message in a non-transitory computer readable medium on the target network device; and using in real-time the cloud storage object from the non-transitory computer readable medium from the cloud application on the target network device from the target network device and from the plurality of other target network devices from the same user of the target network device and using cloud storage object from the non-transitory computer readable medium on the target network device from the plurality of different login accounts from the same user, thereby removing any unwanted previously reviewed portions of the first set of electronic information from display from the target network device, across the plurality of other target network devices and across the plurality of different login accounts from the same user, faster and more efficiently than using the cloud storage object from the cloud communications network.

5. The method of claim 4 further comprising:

using in real-time the cloud storage object from the non-transitory computer readable medium from the cloud application on the target network device from a plurality of other target network devices from a plurality of different users and using cloud storage object from the non-transitory computer readable medium on the target network device from the plurality of different login accounts from the plurality of different users, thereby removing any unwanted previously reviewed portions of the first set of electronic information from display from the plurality of other target network device and across the plurality of different login accounts from the plurality of different users.

6. The method of claim 1 wherein the step of sending a second request message includes securely sending the second request message with a pre-determined security or encryption method.

7. The method of claim 6 wherein the pre-determined security or encryption method includes a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), or a Transport Layer Security (MS) security or encryption method.

8. The method of claim 1 wherein the cloud storage object includes one or more REpresentational State Transfer (REST) or Simple Object Access Protocol (SOAP) cloud storage objects.

9. The method of claim 1 wherein the first set of electronic information includes electronic search engine results, electronic auction results, syndicated electronic news items, non-syndicated electronic news items, tickets for events and transportation or reservations for lodging.

10. The method of claim 1 wherein the step or receiving one or more selection inputs includes receiving one or more selection inputs from displaying a plurality of graphical radio buttons, a plurality of graphical check boxes or a plurality of finger taps on the received first set of electronic information from the cloud application on the target network device on a graphical user interface displayed on a display portion of the target network device.

11. The method of claim 1 wherein the target network device includes a wireless networking interface comprising a Worldwide Interoperability for Microwave Access (WiMax) wireless networking interface with $4^{th}$ generation (4G) wireless speeds for communicating with the cloud communications network.

12. The method of claim 1 wherein the cloud source network device includes a wireless networking interface comprising a Worldwide Interoperability for Microwave Access (WiMax) wireless networking interface with $4^{th}$ generation (4G) wireless speeds for communicating with the cloud communications network.

13. The method of claim 1 wherein the cloud communications network includes a cloud electronic content retrieval and storage service, a cloud computing platform for the electronic content retrieval and storage service and a cloud computing infrastructure for the electronic content retrieval and storage service.

14. The method of claim 13 wherein cloud application offers the cloud computing Infrastructure as a cloud Service (IaaS), the cloud computing Platform, as a cloud Service (PaaS) or offers Specific cloud electronic content retrieval and storage services as a cloud Service (SaaS) including a cloud software service, wherein the IaaS, PaaS and SaaS include one or more of cloud electronic content and retrieval services comprising networking, storage, server network device, virtualization, operating system, middleware, runtime, data or application services, or plural combinations thereof, on the cloud communications network.

15. The method of claim 1 wherein the cloud communications network includes on-demand electronic content retrieval and storage services, broadband network access, resource pooling, rapid elasticity and measured network services for cloud electronic content retrieval and storage service.

16. The method of claim 1 wherein the target network devices include desktop computers, laptop computers, tablet computers, mobile phones, non-mobile phones, smart phones, Internet phones, Internet appliances, personal digital/data assistants (PDA), digital cameras, portable game consoles, non-portable game consoles, cable television (CATV) set-top boxes, satellite television boxes, or digital televisions including a high definition television (HDTV) or a three-dimensional (3D) television.

17. The method of claim 1 wherein the cloud application on the target network device records the selected one or more unwanted portions of the first set electronic information in a data structure on the target network device to further compare any subsequent sets of electronic information requested by the target network device with previously viewed and recorded portions of sets of electronic information, and wherein any recorded previously viewed and recorded portions are not displayed on the target network device.

18. A system for intelligent electronic information processing with cloud computing, comprising in combination:
a non-transitory computer readable medium on a network device with one or more processors including a plurality of instructions:
for sending a first request message requesting a first set of electronic information from a cloud application on a target network device with one or more processors to a cloud source network device with one or more processors via a cloud communications network;
for receiving on the cloud application on the target network device a first response message including the requested first set of electronic information from the cloud source network device via the cloud communications network;
for receiving one or more selection inputs on the cloud application on the target network device to select one or more portions of the first set of electronic information including any unwanted portions that have been reviewed and are to be eliminated from further display on the target network device;
for sending a second request message from the cloud application on the target network device to the cloud source network device via the cloud communications network including an indication to record removal of the selected one or more unwanted portions of the first set electronic information on the cloud communications network, wherein the cloud source network device uses recorded information to compare any subsequent sets of electronic information requested by the target network device with previously viewed and recorded portions of sets of electronic information, and
wherein any recorded previously viewed and recorded portions are not forwarded for display on the target network device;
for eliminating with the second request message any unwanted previously reviewed portions of the first set of electronic information from further display with any additional sets of electronic information received on the cloud application on the target network device,
wherein the cloud source device requests contents of the second request message be recorded as a cloud storage object on other cloud source network devices on one or more public, private, community or hybrid networks on the cloud communications network, wherein the cloud storage object comprises a plurality of separate storage locations distributed across the cloud communications network but functions as a single storage object, and wherein the cloud application on the target network device cannot determine which other cloud source network devices on the one or more public, private, community or hybrid networks on the cloud communications network may have recorded the contents of the second message in the cloud storage object, thereby providing security and privacy for recording requests made by the cloud application on the target network device;

for sending a third request message requesting a second set of electronic information from the cloud application on the target network device to the cloud source network device via the cloud communications network, for receiving on the cloud application on the target network device a second response message including the requested second set of electronic information from the cloud source network device via the cloud communications network, wherein one or more portions of the second set of electronic information are retrieved by the cloud source network device using the cloud storage object from any of the one or more public, private, community or hybrid networks on the cloud communications network, and wherein the received second set of electronic information does not include any unwanted previously reviewed portions selected and recorded and removed from the first set of electronic information;

for displaying with the cloud application on the target network device the received second set of electronic information, wherein the displayed received second set of electronic information does not include any unwanted previously reviewed portions selected and recorded from the first set of electronic information;

for eliminating displaying with the received second set of electronic information on a plurality of other target network devices from a same user of the target network device and from a plurality of different login accounts from the same user on a plurality of server network devices on any of the one or more public, private, community or hybrid networks on the cloud communications network; and for eliminating displaying with the received second set of electronic information across the plurality of other target network devices from the same user and across the plurality of different logins from the same user when any of the target network devices from the same user are used from anywhere on the cloud communications network.

19. The system of claim 18 further comprising:

for using in real-time the recorded selected one or more unwanted portions of the first set electronic information in the cloud storage object for a plurality of other target network devices from a plurality of different users of the target network device and the plurality of other target network devices and from a plurality of different login accounts from the same user and the plurality of different users on a plurality of server network devices on any of the one or more public, private, community or hybrid networks on the cloud communications network, thereby removing any unwanted previously reviewed portions of the first set of electronic information from display across the plurality of other target network devices from the same user and the plurality of different users and across the plurality of different logins from the same user and the plurality of different users when used from anywhere on the cloud communications network.

20. The system of claim 18 further comprising:

for sending a fourth request message requesting a copy of cloud storage object stored on the cloud communications network from the cloud application on the target network device to the cloud source network device via the cloud communications network;

for receiving on the cloud application on the target network device a third response message including the requested copy of the cloud storage object from the cloud source network device via the cloud communications network;

for storing from the cloud application on the target network device the cloud storage object received in the third response message in a non-transitory computer readable medium on the target network device; and for using in real-time the cloud storage object from the non-transitory computer readable medium from the cloud application on the target network device from the target network device and from the plurality of other target network devices from the same user of the target network device and using cloud storage object from the non-transitory computer readable medium on the target network device from the plurality of different login accounts from the same user, thereby removing any unwanted previously reviewed portions of the first set of electronic information from display from the target network device, across the plurality of other target network devices and across the plurality of different login accounts from the same user, faster and more efficiently than using the cloud storage object from the cloud communications network.

* * * * *